United States Patent
Smedley et al.

(10) Patent No.: US 9,433,886 B2
(45) Date of Patent: Sep. 6, 2016

(54) GAS SEPARATION PROCESS

(71) Applicant: Industrial Research Limited, Lower Hutt (NZ)

(72) Inventors: Stuart Smedley, Oceanside, CA (US); Vlatko Materic, Wellington (NZ); Carolyn Mary Henderson, Lower Hutt (NZ)

(73) Assignee: Industrial Research Limited, Lower Hutt (NZ)

( * ) Notice: Subject to any disclaimer, the term of this patent is extended or adjusted under 35 U.S.C. 154(b) by 766 days.

(21) Appl. No.: 13/755,976

(22) Filed: Jan. 31, 2013

(65) Prior Publication Data
US 2013/0202512 A1 Aug. 8, 2013

Related U.S. Application Data

(62) Division of application No. 12/996,501, filed as application No. PCT/NZ2009/000097 on Jun. 5, 2009, now Pat. No. 8,383,072.

(60) Provisional application No. 61/058,937, filed on Jun. 5, 2008.

(51) Int. Cl.
*B01D 53/96* (2006.01)
*B01D 53/62* (2006.01)
(Continued)

(52) U.S. Cl.
CPC ........... *B01D 53/1475* (2013.01); *B01D 53/62* (2013.01); *B01D 53/96* (2013.01); *B01J 20/041* (2013.01); *B01D 2251/402* (2013.01); *B01D 2251/404* (2013.01); *B01D 2251/602* (2013.01); *B01D 2257/504* (2013.01);
(Continued)

(58) Field of Classification Search
None
See application file for complete search history.

(56) References Cited

U.S. PATENT DOCUMENTS

| 4,185,080 A | 1/1980 | Rechmeier |
| 4,226,839 A | 10/1980 | O'Neill et al. |
| 4,312,280 A | 1/1982 | Shearer et al. |

(Continued)

FOREIGN PATENT DOCUMENTS

| EP | 1074297 | 2/2001 |
| GB | 1229415 | 4/1971 |

(Continued)

OTHER PUBLICATIONS

Halstead et al., "The Thermal Dissociation of Calcium Hydroxide." J. Chem. Soc., Jan. 1, 1957, pp. 3873-3875.*

(Continued)

*Primary Examiner* — Daniel Berns
(74) *Attorney, Agent, or Firm* — Dann, Dorfman, Herrell and Skillman, P.C.

(57) ABSTRACT

A process for the separation of carbon dioxide from gas mixtures is disclosed in which a metal oxide sorbent, which is used to capture and release carbon dioxide, is recycled. The process incorporates the regeneration of the carbon dioxide capture capacity of the metal oxide to maintain a high capture capacity over many cycles. The regeneration involves hydrating the metal oxide and then heating the resulting metal hydroxide under a gas atmosphere that is effective to suppress the dehydration of the hydroxide so that dehydration occurs at an elevated temperature. The regeneration may also be used independently from the carbon dioxide separation process to produce, from a metal hydroxide, a metal oxide having an enhanced resistance to attrition and fragmentation.

19 Claims, 8 Drawing Sheets

(51) Int. Cl.
*B01D 53/14* (2006.01)
*B01J 20/04* (2006.01)

(52) U.S. Cl.
CPC ...... *B01D 2258/0283* (2013.01); *Y02C 10/04* (2013.01); *Y02C 10/06* (2013.01); *Y02C 10/08* (2013.01)

(56) References Cited

U.S. PATENT DOCUMENTS

| | | | |
|---|---|---|---|
| 5,665,319 | A | 9/1997 | Hirama et al. |
| 6,280,503 | B1 | 8/2001 | Mayorga et al. |
| 6,290,921 | B1 | 9/2001 | Kuivalainen et al. |
| 6,387,337 | B1 | 5/2002 | Pennline et al. |
| 7,014,834 | B2 | 3/2006 | Lin et al. |
| 2005/0060985 | A1 | 3/2005 | Abanades Garcia et al. |
| 2005/0232856 | A1 | 10/2005 | Stevens et al. |
| 2006/0093540 | A1 | 5/2006 | Fan et al. |
| 2007/0032380 | A1 | 2/2007 | Anthony et al. |
| 2010/0266477 | A1 | 10/2010 | Ishii |

FOREIGN PATENT DOCUMENTS

| | | | |
|---|---|---|---|
| GB | 1384756 | | 2/1975 |
| WO | 9317778 | | 9/1993 |
| WO | 2005046862 | | 5/2005 |
| WO | 2005046863 | | 5/2005 |
| WO | WO2006/113301 | * | 10/2006 ............ C04B 38/00 |
| WO | 2007002792 | | 1/2007 |
| WO | 2007045048 | | 4/2007 |

OTHER PUBLICATIONS

Dinescu et al., "Thermal Decomposition of Strontium Hydroxide." J. Thermal. Analysis, vol. 5 (1973), pp. 465-473.*
International Search Report, PCT/NZ2009/000097, Aug. 19, 2009.
Written Opinion of the International Preliminary Examining Authority, PCT/NZ2009/000097, May 24, 2010.
European Search Report, European Patent Application No. 09758581.4, Aug. 21, 2012, pp. 1-8.
UKIPO Search Report, Aug. 16, 2008, pp. 1-2.
UKIPO Search Report (Continuation), Sep. 16, 2008, pp. 1-2.
F. Scala et al., "Enhancement of Sulfur Uptake by Hydration of Spent Limestone for Fluidized-Bed Combustion Application," Ind. Eng. Chem. Res. (2001) 40, pp. 2495-2501.
V. Manovic et al., "Sequential SO2/CO2 capture enhanced by steam reactivation of a CaO-based sorbent," Fuel 87 (2008), pp. 1564-1573.
V. Manovic et al., "Steam hydration of sorbents from a dual fluidized bed CO2 looping cycle reactor," Fuel 87 (2008) pp. 3344-3352.
K. Kuramoto et al., "Repetitive Carbonation-Calcination Reactions of Ca-Based Sorbents for Efficient CO2 Sorption at Elevated Temperatures and Pressures," Ind. Eng. Chem. Res. 2003, 42, pp. 975-981.
R. W. Hughes et al., "Improved Long-Term Conversion of Limestone-Derived Sorbents for in Situ Capture of CO2 in a Fluidized Bed Combustor," Ind. Eng. Chem. Res. 2004, 43, pp. 5529-5539.
F. Freund et al., "Proton Conductivity of Simple Ionic Hydroxides Part I: The Proton Conductivities of Al(OH)3, Ca (OH)2 and Mg(OH)2," Ber. Bunsenges, Phys. Chem. (1980) 84, pp. 866-873.
G.P. Curran et al., "CO2 Acceptor Gasification Process," Adv. Chem. Ser. 69 (1967), pp. 141-165.
O. Chaix-Pluchery et al., "Calcium Hydroxide Dehydration Early Precursor States," Journal of Solid State Chemistry 50 (1983), pp. 247-255.
D. Beruto et al., "On the Nature of the Crystallographic Disorder in Submicrometer Particles of Ca(OH)2 Produced by Vapour Phase Hydration," Ceramics International, vol. 9, n. 1 (1983), pp. 22-25.
J. Abanades et al., "Cost Structure of a Postcombustion of Co2 Capture System Using CaO," Environ. Sci. Technol. 2007, 41, pp. 5523-5527.
J.C. Abanades et al., "Sorbent Cost and Performance in CO2 Capture Systems," Ind. Eng. Chem. Res. 2004, 43, pp. 3462-3466.
J.C. Abanades et al., "Capture of CO2 from Combustion Gases in a Fluidized Bed of CaO," Environmental and Energy Engineering, AIChE. J., Jul. 2004, vol. 50, No. 7, pp. 1614-1622.
J.C. Abanades et al., "Conversion Limits in the Reaction of CO2 with Lime," Energy & Fuels 2003, 17, p. 308-315.
J.C. Abanades, "The maximum capture efficiency of CO2 using a carbonation/calcination cycle of CaO/CaCO3," Chemical Engineering Journal 90 (2002), pp. 303-306.
J.C. Abanades et al., "In-Situ Capture of CO2 in a Fluidized Bed Combustor," Proc. of 17th Intl. Fluidized Bed Combustion Conference, Jacksonville, Florida, May 2003.
F. Montagnaro et al., "Steam Reactivation of a Spent Sorbent for Enhanced SO2 Capture in FBC," Particle Technology and Fluidization AIChE. J., Dec. 2006, vol. 52, No. 12, pp. 4090-4098.
T. Shimizu et al., "A Twin Fluid-Bed Reactor for Removal of CO2 from Combustion Processes," Trans. IChemE., vol. 77, Part A, Jan. 1999, pp. 62-68.
P. Sun et al., "Investigation of Attempts to Improve Cyclic CO2 Capture by Sorbent Hydration and Modification," Ind. Eng. Chem. Res., 2008, 47, pp. 2024-2032.
P.S. Fennell et al., "Regeneration of sintered limestone sorbents for the sequestration of CO2 from combustion and other systems," Journal of the Energy Institute, vol. 80, No. 2, 2007, pp. 116-119.
F. Zeman et al., "Effect of steam hydration and performance of lime sorbent for CO2 capture," Intl. Journal of Greenhouse Gas Control, vol. 2, No. 2, Mar. 12, 2008, pp. 203-209.
K. Laursen et al., "Characterization of steam reactivation mechanisms in limestones and spent calcium sorbents," Fuel, IPC Science and Technology Press, vol. 80, No. 9, Jul. 1, 2001, pp. 1293-1306.

* cited by examiner

GAS SEPARATION PROCESS

CROSS REFERENCE TO RELATED APPLICATIONS

This application is a division of copending application Ser. No. 12/996,501, filed Mar. 11, 2011, which is the national stage of International Application No. PCT/NZ2009/000096, filed Jun. 5, 2009, which claims priority from U.S. Provisional Application No. 61/058,937, filed Jun. 5, 2008, the entireties of which are incorporated herein by reference.

TECHNICAL FIELD

The present invention relates to the separation of $CO_2$ from gas mixtures. More particularly, the invention relates to a $CO_2$ separation process in which a sorbent, which is used for absorbing the $CO_2$, is recycled.

BACKGROUND ART

Addressing climate change is a large-scale global challenge. Currently, the world's economies annually emit approximately 26 gigatons of $CO_2$ ($GtCO_2$) to the atmosphere from the combustion of fossil fuels. In the absence of explicit efforts to address climate change, rising global populations, higher standards of living, and increased demand for energy could result in as much as 9,000 gigatons of cumulative $CO_2$ being emitted to the atmosphere from fossil fuel combustion over the next century.

To stabilize $CO_2$ concentrations in the atmosphere "at a level that would prevent dangerous anthropogenic interference with the climate system" as called for in the United Nations Framework Convention on Climate Change, the cumulative amount of $CO_2$ released to the atmosphere over this century would need to be held to no more than 2,600 to 4,600 $GtCO_2$—a substantial reduction and a formidable challenge.

$CO_2$ Capture and Sequestration (CCS) is one of the most important of the mitigation options. CCS involves the separation $CO_2$ from industrial and energy-related sources, transport to a storage location and long-term isolation from the atmosphere. Technologies exist or are under development to capture $CO_2$ but their cost provides a significant barrier to widespread adoption. Transport to sites for alternative use or sequestration is provided by traditional compression and pipeline technologies. Other uses for captured $CO_2$ are for enhanced oil recovery, coal bed methane recovery and food and beverage processing. Current examples of $CO_2$ capture from process streams include the purification of natural gas and production of hydrogen-containing synthesis gas for the manufacture of ammonia, alcohols and synthetic liquid fuels.

The use of CaO (commonly known as burnt lime, lime or quicklime) as a regenerable sorbent for $CO_2$ capture has been proposed in several processes dating back to the 19th century. The carbonation reaction of CaO to separate $CO_2$ from hot gases (T>200° C.) and form $CaCO_3$ is very fast. The regeneration of the sorbent by calcining the $CaCO_3$ into CaO and pure $CO_2$ is favored at T>900° C. (at a $CO_2$ partial pressure of 0.1 MPa).

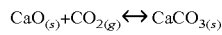

$$CaO_{(s)} + CO_{2(g)} \leftrightarrow CaCO_{3(s)} \qquad \text{EQUATION 1:}$$

This carbonation-calcination cycle was successfully tested in a pilot plant (40 tonne $d^{-1}$) for the development of the acceptor coal gasification process using two interconnected fluidized beds (see G. P. Curran, C. E. Fink and E. Gorin, Adv. Chain. Ser. 69 (1967) 141-165). The use of the above cycle (Equation 1) for a post-combustion system was first proposed by Shimizu et al. (IChemE., 77-A (1967) 62-70) and involved the regeneration of the sorbent in a fluidized, firing part of the fuel with $O_2/CO_2$ mixtures. The effective capture of $CO_2$ by CaO has also been demonstrated in a small pilot fluidized bed (J. C. Abanades at al. AIChE. J. 50(7) (2004) 1614-1622).

A disadvantage of all of these processes is that the capacity of natural sorbents (limestones and dolomites) to capture $CO_2$ typically diminishes rapidly, and a large make-up flow of sorbent (of the order of the mass flow of fuel entering the plant) is required to maintain the $CO_2$ capture activity in a capture-regeneration loop (J. C. Abanades, B. S. Rubin and E. J. Anthony Ind. Eng. Chem. Res. 43 (2004) 3462-3466). Although the deactivated sorbent may find application in th cement industry and the sorbent cost is low, a range of methods to enhance the activity of calcium-based $CO_2$ sorbents have been pursued.

Abanades and co-workers have published several papers examining the $CaO/CO_2$ system employing sequential calcination and carbonation steps (see: J. C. Abanades at al. "In-situ capture of $CO_2$ in a fluidized bed combustor" Proc. 17th Int. Fluidized Bed Combustion Conference, Jacksonville, Fla., May 2003; J. C. Abanades and D. Alvarez Energy Fuels 17 (2003) 308-315; and J. C. Abanades Chem. Eng. J. 90 (2002) 303-306). They reported that the capacity of limestone to be recarbonated falls continuously with the number of cycles. After examining data from a number of researchers who used different limestones, different particle sizes (10 μm to 10 mm) and a range of treatment temperatures (750 to 1060° C.), they concluded that there was uniformity in the conversion displayed by equivalent data, which defined a generalized correlation. The correlation relating the conversion capacity to the number of the cycle is given as:

$$X_N = f_m^N(1-f_W) + f_W \qquad (1)$$

where N is the number of the cycle (for uncalcined limestone N=0), and $f_m$ is the fractional loss in conversion from the previous cycle, assumed constant with N. The parameter $f_w$ is the theoretical residual capacity after infinite cycles. From their collection of data, Abanades and Alvarez (Energy Fuels 17 (2003) 308-315) assigned values of 0.77 to $f_m$ and 0.17 to $f_w$.

WO 2005/046863 describes a process for reactivating lime-based sorbents for multiple $CO_2$ capture cycles during the fluidized bed oxidation of combustion fuels by hydrating the lime after each calcination or by shocking the lime with pure $CO_2$.

Fennell et al. (J. Energy Inst. 80 (2007) 116-119) have shown that the drop in $CO_2$ absorption capacity when limestone is subject to at least 10 calcination-carbonation cycles is partially recovered when the lime is exposed to water vapor at ambient temperatures overnight. They also observed that the limestone underwent substantial attrition which they attributed to the regeneration by the hydration step.

The reactivity and durability of calcium-based sorbents for $CO_2$ absorption during repetitive carbonation-calcination reactions at different pressures in a laboratory-scale horizontal-tube reactor has been investigated (K. Kuramoto et al. Ind. Eng. Chem. Res. 42 (2003) 975-981). It was found that the sorbents were significantly deactivated with respect to $CO_2$ absorption by high-temperature calcination treatment as a result of sintering and crystal growth. As a consequence, their $CO_2$ absorption capacity decreases with cycle number in repetitive calcination-carbonation reactions under both atmospheric and pressurized conditions. For at least seven cycles hydration treatment was effective in reactivating these sorbents. Also, the durability of the sorbents in repetitive $CO_2$ sorption was recovered by hydration treatment both at ambient temperature and pressure, and at elevated pressure at 200° C. However, at elevated pressure, the sorbents melted in repetitive calcination-hydration-carbonation reactions at 923 K and 973 K, most likely because of eutectics in the $CaO$—$Ca(OH)_2$—$CaCO_3$ ternary system.

Accordingly, it is an object of the present invention to go some way to avoiding the above disadvantages or to at least provide the public with a useful choice.

Other objects of the invention may become apparent from the following description which is given by way of example only.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date.

SUMMARY OF THE INVENTION

In a first aspect, the present invention provides a process for separating $CO_2$ from a first gas stream comprising $CO_2$, the process comprising the steps of:
(a) calcining a metal carbonate to generate a metal oxide and produce a first product gas stream comprising $CO_2$;
(b) contacting the metal oxide with the first gas stream to carbonate the metal oxide and regenerate the metal carbonate;
(c) calcining the metal carbonate regenerated in step (h) to regenerate the metal oxide and produce a second product gas stream comprising $CO_2$;
(d) optionally repeating steps (b) and (c) using the metal oxide regenerated in step (c);
(e) contacting the metal oxide regenerated in step (c) with water to form a metal hydroxide;
(f) heating the metal hydroxide in a second gas stream comprising $CO_2$ to a temperature that is higher than the normal decomposition temperature for the metal hydroxide;
(g) dehydrating the metal hydroxide to regenerate the metal oxide;
(h) optionally repeating steps (e) to (g) using the metal oxide regenerated in step (g);
(i) contacting the metal oxide regenerated in step (g) with a third gas stream comprising $CO_2$ to carbonate the metal oxide and regenerate the metal carbonate;
(j) optionally repeating steps (c) to (i) using the metal carbonate regenerated in step (1); and
(k) repeating steps (a) to (j) using the metal carbonate regenerated in step (i), In a second aspect, the present invention provides a process for separating $CO_2$ from a first gas stream comprising $CO_2$, the process comprising the steps of:
(a) calcining a metal carbonate to generate a metal oxide and produce a first product gas stream comprising $CO_2$;
(b) contacting the metal oxide with the first gas stream to carbonate the metal oxide and regenerate the metal carbonate;
(c) calcining the metal carbonate regenerated in step (b) to regenerate the metal oxide and produce a second product gas stream comprising $CO_2$;
(d) optionally repeating steps (b) and (c) using the metal oxide regenerated in step (c);
(e) contacting the metal oxide regenerated in step (c) with water to form a metal hydroxide;
(f) heating the metal hydroxide in a second gas stream comprising $CO_2$ to a temperature that is higher than the normal decomposition temperature for the metal hydroxide, and to a temperature and for a time and at a concentration of $CO_2$ effective to suppress the dehydration of the metal hydroxide and reduce the attrition and fragmentation rates, compared to those that would otherwise occur, of the metal oxide formed upon dehydration of the metal hydroxide;
(g) dehydrating the metal hydroxide to regenerate the metal oxide;
(h) optionally repeating steps (e) to (g) using the metal oxide regenerated in step (g);
(i) contacting the metal oxide regenerated in step (g) with a third gas stream comprising $CO_2$ to carbonate the metal oxide and regenerate the metal carbonate;
(j) optionally repeating steps (c) to (i) using the metal carbonate regenerated in step (i); and
(k) repeating steps (a) to (j) using the metal carbonate regenerated in step (i).

In a third aspect, the present invention provides a process for separating $CO_2$ from a first gas stream comprising $CO_2$, the process comprising the steps of:
(a) contacting a metal oxide with the first gas stream to carbonate the metal oxide and form a metal carbonate;
(b) calcining the metal carbonate to regenerate the metal oxide and produce a product gas stream comprising $CO_2$;
(c) repeating steps (a) and (b) using the metal oxide regenerated in step (b);
(d) contacting the metal oxide regenerated in step (b) with water to form a metal hydroxide;
(e) heating the metal hydroxide in a second gas stream comprising $CO_2$;
(f) dehydrating the metal hydroxide in a third gas stream to regenerate the metal oxide; and
(g) repeating steps (a) to (f) using the metal oxide regenerated in step (f).

In a fourth aspect, the present invention provides a process for separating $CO_2$ from a first gas stream comprising $CO_2$, the process comprising the steps of:
(a) calcining a metal carbonate to generate a metal oxide and produce a first product gas stream comprising $CO_2$;
(b) contacting the metal oxide with the first gas stream to carbonate the metal oxide and regenerate the metal carbonate;
(c) Calcining the metal carbonate regenerated in step (b) to regenerate the metal oxide and produce a second product gas stream comprising $CO_2$;
(d) optionally repeating steps (b) and (c) using the metal oxide regenerated in step (c);
(e) contacting the metal oxide regenerated in step (c) with water to form a metal hydroxide;
(f) heating the metal hydroxide in a second gas stream, wherein the second gas stream comprises a gas effective to suppress the dehydration of the metal hydroxide, to a temperature that is higher than the normal decomposition temperature for the metal hydroxide;
(g) dehydrating the metal hydroxide to regenerate the metal oxide;

(h) optionally repeating steps (e) to (g) using the metal oxide regenerated in step (g);
(i) contacting the metal oxide regenerated in step (g) with a third gas stream comprising $CO_2$ to carbonate the metal oxide and regenerate the metal carbonate;
(j) optionally repeating steps (c) to (i) using the metal carbonate regenerated in step (i); and
(k) repeating steps (a) to (j) using the metal carbonate regenerated in step (i).

In a fifth aspect, the present invention provides a process for separating $CO_2$ from a first gas stream comprising $CO_2$, the process comprising the steps of:
(a) calcining a metal carbonate to generate a metal oxide and produce a first product gas stream comprising $CO_2$;
(b) contacting the metal oxide with the first gas stream to carbonate the metal oxide and regenerate the metal carbonate;
(c) calcining the metal carbonate regenerated in step (b) to regenerate the metal oxide and produce a second product gas stream comprising $CO_2$;
(d) optionally repeating steps (b) and (c) using the metal oxide regenerated in step (c);
(e) contacting the metal oxide regenerated in step (c) with water to form a metal hydroxide;
(f) heating the metal hydroxide in a second gas stream, wherein the second gas stream comprises a gas effective to suppress the dehydration of the metal hydroxide, to a temperature that is higher than the normal decomposition temperature for the metal hydroxide, and to a temperature and for a time and at a concentration of the gas effective to suppress the dehydration of the metal hydroxide and reduce the attrition and fragmentation rates, compared to those that would otherwise occur, of the metal oxide formed upon dehydration of the metal hydroxide;
(g) dehydrating the metal hydroxide to regenerate the metal oxide;
(h) optionally repeating steps (e) to (g) using the metal oxide regenerated in step (g);
(i) contacting the metal oxide regenerated in step (g) with a third gas stream comprising $CO_2$ to carbonate the metal oxide and regenerate the metal carbonate;
(j) optionally repeating steps (c) to (i) using the metal carbonate regenerated in step (i); and
(k) repeating steps (a) to (j) using the metal carbonate regenerated in step (i).

In a sixth aspect, the present invention provides a process for producing a metal oxide by dehydrating a metal hydroxide, the process comprising heating the metal hydroxide in a gas stream, wherein the gas stream comprises a gas effective to suppress the dehydration of the metal hydroxide, to a temperature higher than the normal dehydration temperature for the metal hydroxide, and dehydrating the metal hydroxide to obtain the metal oxide.

In a seventh aspect, the present invention provides a process for restoring the ability of a metal oxide to react with $CO_2$, wherein the metal oxide is used in a cyclic process, wherein the metal oxide is reacted with $CO_2$ to form a metal carbonate and the metal carbonate is calcined to regenerate the metal oxide, the process comprising the steps of:
(a) contacting the metal oxide with water to form a metal hydroxide;
(b) heating the metal hydroxide in a gas stream, wherein the gas stream comprises a gas effective to suppress the dehydration of the metal hydroxide, to a temperature higher than the normal dehydration temperature for the metal hydroxide; and
(c) dehydrating the metal hydroxide to regenerate the metal oxide.

The present invention also provides apparatus adapted to perform a process of the invention.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Unless otherwise specified, the gas concentrations in this specification are expressed as mol %.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

The term "and/or" as used in this specification means "and", or "or", or both.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

Although the present invention is broadly as defined above, those persons skilled in the art will appreciate that the invention is not limited thereto and that the invention also includes embodiments of which the following description gives examples.

BRIEF DESCRIPTION OF THE DRAWINGS

The invention will now be described with reference to the Figures in which.

DETAILED DESCRIPTION OF THE INVENTION

Figure 1:
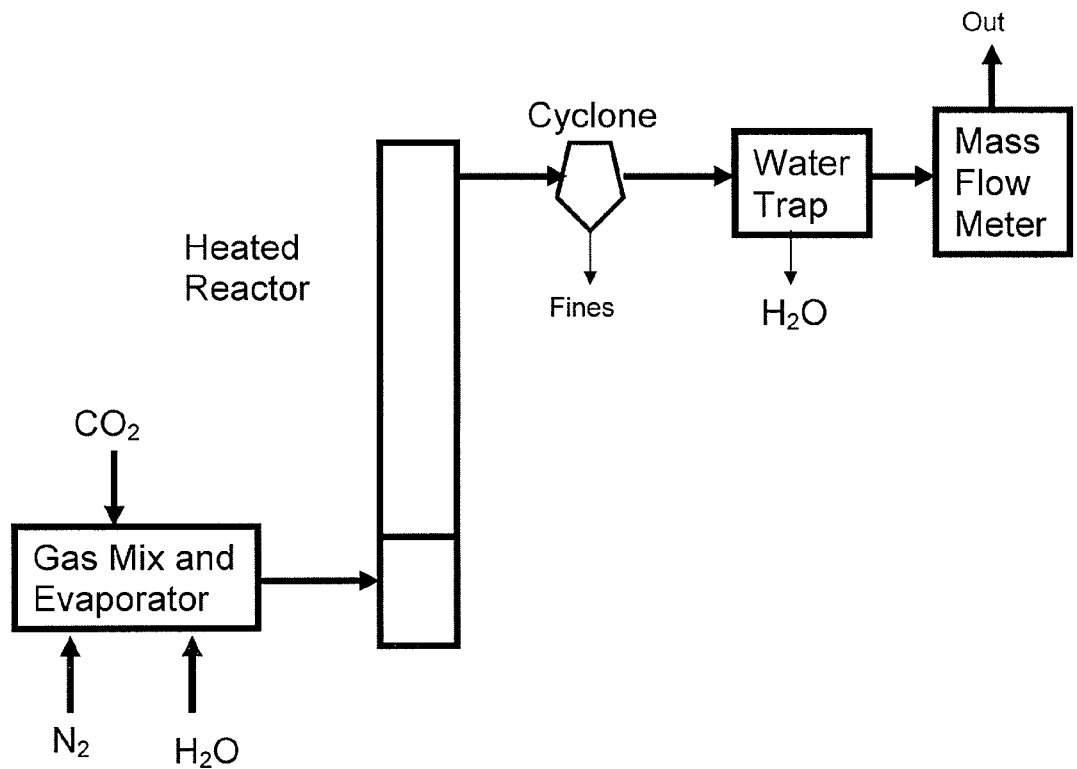
FIG. 1 shows a schematic diagram of a fluidized bed reactor useful for a reaction cycling regime using CaO as a $CO_2$ sorbent.

The tendency for lime to undergo structural changes during repeated carbonation-calcination cycles significantly reduces its capacity to absorb $CO_2$ and reduces the efficacy and economic efficiency of conventional $CO_2$ absorption processes in which a lime sorbent is recycled.

Hydrating lime at least partially restores its capacity to absorb $CO_2$ which otherwise reduces with repeated carbonation-calcination cycles. However, hydrating lime induces structural changes in the material. These changes eventually lead to a weakening of the lime, resulting in significantly increased attrition and fragmentation of the lime sorbent in subsequent carbonation-calcination cycling, especially in fluidized bed reactors. This means that conventional hydration is ineffective in reducing the loss of $CO_2$ absorption activity during carbonation-calcination cycling, because the $CO_2$ absorption activity is limited by losses to attrition and fragmentation.

The present invention relates to a process for regenerating the $CO_2$ capture capacity of a metal oxide that is used in a cyclic $CO_2$ capture process. The present invention further relates to a cyclic process that uses a metal oxide to capture and release $CO_2$ and that intermittently regenerates the $CO_2$ capture capacity of the metal oxide to maintain a high capture capacity, with reduced rates of attrition and fragmentation, over many cycles. The present invention also relates to a process for producing a metal oxide from a metal hydroxide, wherein the product metal oxide has an enhanced resistance to attrition and fragmentation.

More specifically, in a first aspect, the present invention provides a process for separating $CO_2$ from a first gas stream comprising $CO_2$, the process comprising the steps of:
(a) calcining a metal carbonate to generate a metal oxide and produce a first product gas stream comprising $CO_2$;
(b) contacting the metal oxide with the first gas stream to carbonate the metal oxide and regenerate the metal carbonate;
(c) calcining the metal carbonate regenerated in step (b) to regenerate the metal oxide and produce a second product gas stream comprising $CO_2$;
(d) optionally repeating steps (b) and (c) using the metal oxide regenerated in step (c);
(e) contacting the metal oxide regenerated in step (c) with water to form a metal hydroxide;
(f) heating the metal hydroxide in a second gas stream comprising $CO_2$ to a temperature that is higher than the normal decomposition temperature for the metal hydroxide;
(g) dehydrating the metal hydroxide to regenerate the metal oxide;
(h) optionally repeating steps (e) to (g) using the metal oxide regenerated in step (g);
(i) contacting the metal oxide regenerated in step (g) with a third gas stream comprising $CO_2$ to carbonate the metal oxide and regenerate the metal carbonate;
(j) optionally repeating steps (c) to (i) using the metal carbonate regenerated in step (i); and
(k) repeating steps (a) to (j) using the metal carbonate regenerated in step (i).

In as second aspect, the present invention provides a process for separating $CO_2$ from a first gas stream comprising $CO_2$, the process comprising the steps of:
(a) calcining a metal carbonate to generate a metal oxide and produce a first product gas stream comprising $CO_2$;
(b) contacting the metal oxide with the first gas stream to carbonate the metal oxide and regenerate the metal carbonate;
(c) calcining the metal carbonate regenerated in step (b) to regenerate the metal oxide and produce a second product gas stream comprising $CO_2$;
(d) optionally repeating steps (b) and (c) using the metal oxide regenerated in step (c);
(e) contacting the metal oxide regenerated in step (c) with water to form a metal hydroxide;
(f) heating the metal hydroxide in a second gas stream comprising $CO_2$ to a temperature that is higher than the normal decomposition temperature for the metal hydroxide, and to a temperature and for a time and at a concentration of $CO_2$ effective to suppress the dehydration of the metal hydroxide and reduce the attrition and fragmentation rates, compared to those that would otherwise occur, of the metal oxide formed upon dehydration of the metal hydroxide;
(g) dehydrating the metal hydroxide to regenerate the metal oxide;
(h) optionally repeating steps (e) to (g) using the metal oxide regenerated in step (g);
(i) contacting the metal oxide regenerated in step (g) with a third gas stream comprising $CO_2$ to carbonate the metal oxide and regenerate the metal carbonate;
(j) optionally repeating steps (c) to (i) using the metal carbonate regenerated in step (i); and
(k) repeating steps (a) to (j) using the metal carbonate regenerated in step (i).

In a third aspect, the present invention provides a process for separating $CO_2$ from a first gas stream comprising $CO_2$, the process comprising the steps of:
(a) contacting a metal oxide with the first gas stream to carbonate the metal oxide and form a metal carbonate;
(b) calcining the metal carbonate to regenerate the metal oxide and produce a product gas stream comprising $CO_2$;
(c) repeating steps (a) and (b) using the metal oxide regenerated in step (b);
(d) contacting the metal oxide regenerated in step (b) with water to form a metal hydroxide;
(e) heating the metal hydroxide in a second gas stream comprising $CO_2$;
(f) dehydrating the metal hydroxide in a third gas stream to regenerate the metal oxide; and
(g) repeating steps (a) to (f) using the metal oxide regenerated in step (i).

Metal Oxide

A number of metal oxides can be carbonated to form the corresponding metal carbonate that, in turn, can be calcinated to regenerate the metal oxide. Any of these oxides may be used as the $CO_2$ sorbent in a process of the invention.

In one embodiment, the metal oxide is selected from the group consisting of: alkali metal oxides; alkaline earth metal oxides; first row transition metal oxides; aluminum oxide; lead oxide; and mixtures of any two or more thereof. In another embodiment, the metal oxide is selected from the group consisting of alkaline earth metal oxides; zinc oxide; manganese oxide; nickel oxide; copper oxide; lead oxide; and mixtures of any two or more thereof. In a preferred embodiment, the metal oxide is an alkaline earth metal oxide. In another preferred embodiment, the metal oxide is selected from: CaO; MgO; and mixtures thereof. A metal oxide within this embodiment may be formed by calcining dolomite (calcium magnesium carbonate, $CaMg(CO_3)_2$). In another preferred embodiment, the metal oxide is CaO. A metal oxide within this embodiment may be formed by calcining limestone (calcium carbonate, $CaCO_3$).

The invention also contemplates embodiments in which the starting material for the third embodiment is a metal carbonate such that the process comprises a preliminary step, before step (a), of calcining the metal carbonate to form the metal oxide.

Calcination

Any calcination process may be utilized to calcine the metal carbonate to regenerate the metal oxide and produce a stream of $CO_2$. The selection of the temperature at which the metal carbonate is calcined will depend on the pressure, particularly on the partial pressure of $CO_2$. In one embodiment, the carbonate is calcined by heating to a temperature between about 700° C. and about 1100° C. under a partial pressure of $CO_2$ that is below the equilibrium pressure. Under these conditions, the carbonate rapidly decomposes to release a stream of $CO_2$.

The various product gas streams comprising $CO_2$ gas obtained upon calcination of the metal carbonate may be suitable for direct utilization or, if necessary, may be further purified, for example by scrubbing to remove particulate matter. In one embodiment, the product gas streams comprise substantially pure $CO_2$.

Carbonation

Gas streams comprising $CO_2$ are well-known in the art and include, but are not limited to: flue gas from combustion processes; syngas of different compositions produced by gasifiers; gas outputs from cement kilns and steel production; gas outputs from ammonia synthesis; gas outputs from various biological reactors, including fermenters and digesters; some natural gas; and air. In some embodiments, the gas stream comprising $CO_2$ is a post-combustion gas stream and in other embodiments, the gas stream is a pre-combustion gas stream.

In one embodiment, the first gas stream comprises $CO_2$ in a concentration from about 5% to about 100%. However, the invention is not limited thereto and the first gas stream may comprise $CO_2$ in a concentration that is outside this range. For example, the first gas stream may comprise ambient air, in which the $CO_2$ concentration is about 380 ppm.

The selection of the temperature at which the metal oxide is contacted with a gas stream comprising $CO_2$ to carbonate the metal oxide and form the metal carbonate will depend on the pressure, particularly on the partial pressure of $CO_2$. Typically, the metal oxide is contacted with the gas stream comprising $CO_2$ at a temperature between about 300° C. and about 950° C.

However, temperatures outside this range may be used in some embodiments. In particular, higher temperatures may be used where the partial pressure of $CO_2$ is sufficiently high, In one embodiment, the metal oxide is carbonated at a temperature from 600° C. to 800° C. The length of time that the metal oxide is contacted with the gas stream comprising $CO_2$ will also depend on the pressure and temperature of the gas stream. In one embodiment, the metal oxide is contacted with the gas stream comprising $CO_2$ for 5 minutes to 60 minutes. Time outside this range may be used in other embodiments.

In those embodiments wherein the first gas stream is at atmospheric or low pressure and high temperature—for example, in post-combustion applications, and gas outputs from cement kilns—the temperature is typically between about 450° C. and about 800° C. In those embodiments wherein the first gas stream is at high pressure and high temperature—for example, in pre-combustion applications and gas outputs from gasifiers—the temperature is typically between about 550° C. and about 950° C.

In those embodiments wherein the first gas stream is at low temperature—for example, in air, and gas outputs from biological reactors such as fermenters and digesters—the metal oxide may be contacted with the first gas stream at ambient temperature, or the first gas stream may be compressed and/or heated prior to contacting the metal oxide.

Apparatus

Suitable apparatus for performing the process of the invention are well-known. The various process steps may be performed at ambient pressure or, in some embodiments, one or more steps may be performed at elevated or reduced pressure.

The metal oxide may be contacted with a gas stream comprising $CO_2$ or with water using a suitable gas-solid contact reactor.

In one embodiment, the gas-solid contact reactor comprises a mobile solid phase. In a preferred embodiment, the gas-solid contact reactor comprises a fluidized or moving bed. In some embodiments, a fluidized or moving bed system may be preferred to improve the gas-solid contact; facilitate mass transfer in and out of the solid; improve the heat transfer properties of the solid; and facilitate the transfer of the solid from one reaction (reactor) to another.

Accordingly, in a preferred embodiment, at least one step of a process of the invention is performed in one or more fluidized or moving bed. In another preferred embodiment, all of the steps are performed in one or more fluidized or moving bed.

It is well-known that the interparticle collisions in fluidized and moving bed systems cause mechanical deterioration of the solid and the production of fines that may be elutriated from the system. Such fines may result in a loss of still active sorbent or require the use of dust separation units. In addition, the presence of fines may make fluidization of the solid more difficult to achieve.

Calcium oxide can be chemically activated for use as a $CO_2$ sorbent by hydration with water between calcination and carbonation in a cyclic process. However, hydration of calcium oxide is disadvantageous for its physical properties. Repeated cycling in this manner (carbonation-calcination-hydration-dehydration) causes the material to vesiculate, expand and become very brittle. Hydration alone is, therefore, insufficient to maintain calcium oxide as a viable $CO_2$ sorbent over many tens of cycles in a fluidized bed reactor.

Accordingly, the present invention provides a sequence of steps involving hydration for sorbent activation and thermal treatment of the resulting hydroxide to enhance particle resistance to attrition and fragmentation in the harsh conditions of a fluidized bed. Advantageously, each of the steps in the process of the present invention may be performed in the same fluidized bed, thereby avoiding the inefficiencies associated with moving the sorbent material between a number of different reactors. However, the invention is not limited thereto and embodiments in which the sorbent material is moved between two or more reactors either between or during the various steps of the process are also contemplated.

The invention also includes embodiments in which the sorbent material is held in several reactors and the mass flows into and out of the reactors are controlled to achieve continuous processing of the first gas stream comprising $CO_2$.

The steps used in the present invention reduce the need to add additional $CO_2$ sorbent. However, if necessary, fresh sorbent can be added to replace the amount lost from the system as fines or otherwise lost through side reactions such as reaction with other components in the gas stream.

In one embodiment of the first and second aspects, the number of times steps (b) and (c) are repeated in step (d) is from 1 to 20. In another embodiment, the number of times steps (b) and (c) are repeated in step (d) is from 2 to 4.

In one embodiment of the first and second aspects, the number of times steps (e) to (g) are repeated in step (h) is from 1 to 20. In another embodiment, the number of times steps (e) to (g) are repeated in step (h) is from 1 to 4.

In a preferred embodiment of the first and second aspects, step (h) is omitted.

In one embodiment of the first and second aspects, the number of times steps (c) to (i) are repeated in step (j) is from 1 to 20. In another embodiment, the number of times steps (e) to (i) are repeated in step (j) is from 1 to 4.

In a preferred embodiment of the first and second aspects, step (j) is omitted.

In one embodiment of the third aspect, the number of times steps (a) and (b) are repeated in step (c) is from 1 to 20. In another embodiment, the number of times steps (a) and (b) are repeated in step (c) is from 2 to 4.

In one embodiment, the amount of metal oxide retained in the fluidized bed is at least about 85% of the initial amount after 75 calcinations. Preferably, the amount of metal oxide retained in the fluidized bed is at least about 90% of the initial amount after 75 calcinations.

In one embodiment, the metal oxide retains an average $CO_2$ absorption capacity of at least about 40%, measured with respect to the initial capacity, after 75 calcinations. Preferably, the metal oxide retains an average $CO_2$ absorption capacity of at least about 55% after 75 calcinations.

In one embodiment, the metal oxide retains an average $CO_2$ absorption capacity of at least about 315 g $CO_2$/kg metal oxide after 75 calcinations. Preferably, the metal oxide retains an average $CO_2$ absorption capacity of at least about 430 g $CO_2$/kg metal oxide after 75 calcinations.

Hydration

The metal oxide may be contacted with water that is either in the liquid phase or is water vapor. In a preferred embodiment, the metal oxide is contacted with water vapor. In some embodiments, the contacting is performed at elevated pressure.

The metal oxide is typically contacted with water at a partial pressure above the equilibrium pressure for the formation of the metal hydroxide at the selected hydration temperature. In one embodiment, the metal oxide is contacted with water vapor at an absolute humidity from 5% to 100%. In a preferred embodiment, the absolute humidity is from 30% to 43%.

In one embodiment, the metal oxide is contacted with water vapor at a temperature from 100° C. to 700° C. In a preferred embodiment, the temperature is from 100° C. to 450° C., more preferably from 100° C. to 400° C., more preferably from 150° C. to 400° C., more preferably from 280° C. to 380° C.

The metal oxide is typically contacted with water until the hydration reaction is at least substantially complete.

In one embodiment, the metal hydroxide is maintained in the presence of the water vapor for a time from 5 to 60 minutes. Preferably, the time is from 15 to 25 minutes.

During the sequence of reactions, hydration is followed by heating the metal hydroxide in the presence of $CO_2$. Therefore, in some embodiments, there will be some overlap between these process steps, such that $CO_2$ is present during the hydration of the metal oxide.

Accordingly, in one embodiment, $CO_2$ is added to the water vapor after the metal oxide has partially or fully hydrated. In one embodiment, the water vapor further comprises $CO_2$ in the range from 0% to 75%. In another embodiment, the water vapor further comprises $CO_2$ in the range from 0% to 20%.

Dehydration

Conventionally, a metal hydroxide may be dehydrated by heating to a temperature between about 400° C. and about 700° C. under a water vapor pressure that is below the equilibrium vapor pressure for the hydroxide at the selected pressure. Alternatively, the metal hydroxide may be dehydrated at a lower temperature, for example down to about 100° C., by reducing the pressure at which the dehydration takes place.

As set out above, the sequence of process steps disclosed herein includes thermal treatment of the metal hydroxide to enhance the resistance of the sorbent particles to attrition and fragmentation in the harsh conditions of a fluidized bed. This thermal treatment involves heating the metal hydroxide in a second gas stream comprising $CO_2$. In some embodiments, this treatment may be performed at elevated pressure.

Advantageously, heating the metal hydroxide in the second gas stream comprising $CO_2$ enables the metal hydroxide to be heated to a higher temperature than that at which dehydration would be expected to occur—the normal decomposition temperature. Heating the metal hydroxide in an atmosphere comprising $CO_2$ results in a thermodynamically unstable metal hydroxide.

Accordingly, in one embodiment of the third aspect, step (e) comprises heating the metal hydroxide to a temperature that is higher than the normal decomposition temperature for the metal hydroxide.

The term "normal decomposition temperature" as used in this specification means the temperature at which dehydration of the metal hydroxide is observed to occur under an inert atmosphere (such as a $N_2$ atmosphere) in equivalent apparatus and under equivalent process conditions. Such process conditions may include the water vapor pressure, total gas flow, reactor size and type (for example, fluidized or static bed), sorbent amount, sorbent particle size, sorbent history, heat flow etc. Generally, dehydration will be observed when the metal hydroxide loses water at a rate of about 0.5% w/w per minute. Those persons skilled in the art can readily determine the normal decomposition temperature of the metal hydroxide without undue experimentation.

Figure 9:
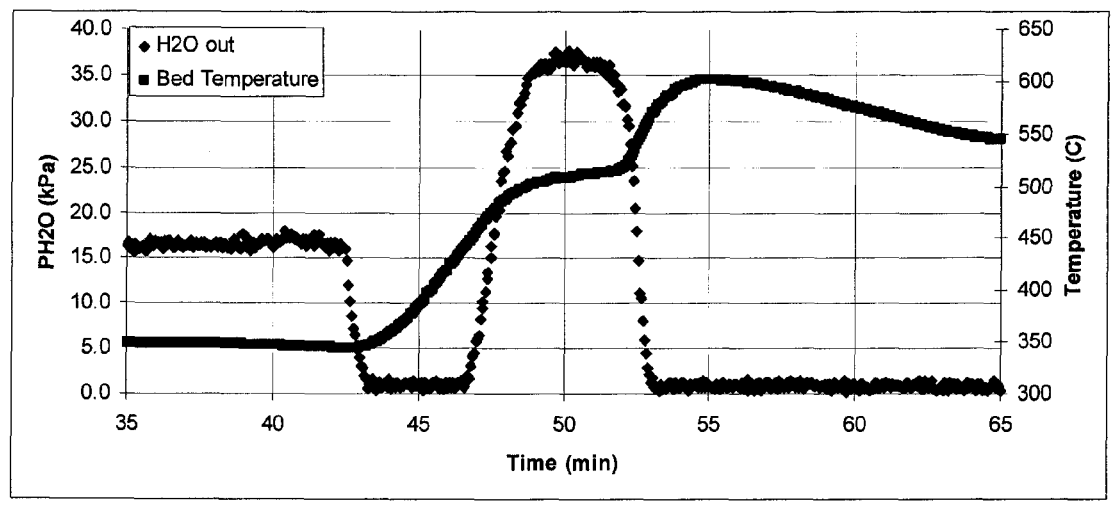
FIG. 9 shows the variation of temperature and the water vapor pressure over a bed of $Ca(OH)_2$ as a function of time during the heating of the bed under $N_2$.
Figure 12:
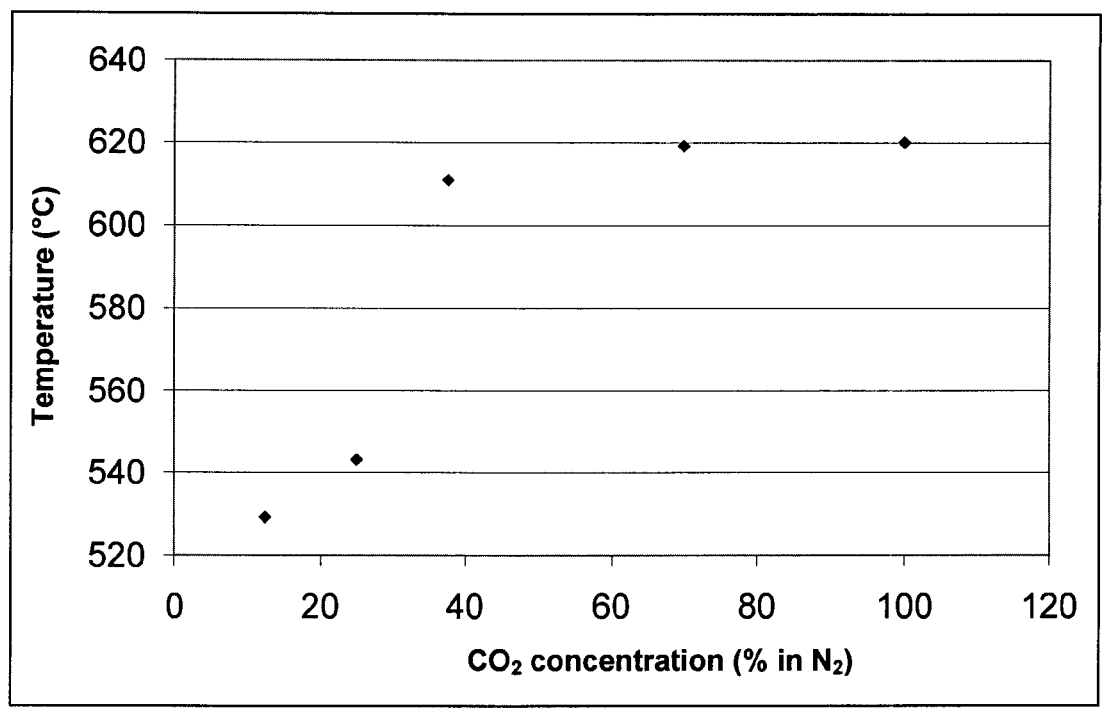
FIG. 12 shows the dependence of $Ca(OH)_2$ dehydration temperature on $CO_2$ concentration.

For example, FIG. 9 shows that the normal decomposition temperature of $Ca(OH)_2$ in a stream of $N_2$ is about 445° C. in the apparatus and under the conditions described in the Examples. As shown in FIG. 12, that decomposition temperature in the same apparatus and under equivalent process conditions increases to: 529° C. for a 12.5% $CO_2/N_2$ mixture; 543° C. for a 25% $CO_2/N_2$ mixture; 611° C. for a 37.5% $CO_2/N_2$ mixture; 619° C. for a 70% $CO_2/N_2$ mixture; and 620° C. for 100% $CO_2$ gas.

The subsequent dehydration of the thermodynamically unstable metal hydroxide produces a metal oxide that has lower attrition and fragmentation rates during subsequent cycling in a fluidized bed reactor than the metal oxide produced by conventional dehydration. The increased mechanical strength of the metal oxide is thought to arise from maintaining the metal hydroxide in a thermodynamically unstable state, at temperatures higher than normal metal hydroxide decomposition temperature. It is thought that, at these temperatures, a process akin to annealing occurs, where the strains and crystal defects formed during hydration of the metal oxide are healed. The extent of healing may, therefore, be proportional to both the temperature and the time spent by the metal hydroxide in the thermodynamically unstable state.

In one embodiment, the second gas stream comprising $CO_2$ is the same as the first gas stream. However, the invention also includes embodiments in which the second as stream comprises a different concentration of $CO_2$. For example, the first gas stream may be enriched or depleted in $CO_2$ to provide the second stream. Alternatively, the second gas stream may be substantially pure $CO_2$.

Advantageously, the various product gas streams comprising $CO_2$ gas obtained upon calcination of the metal carbonate may be recycled to provide the $CO_2$ used in the second gas stream. Accordingly, in a preferred embodiment, the second gas stream comprises $CO_2$ from the first and/or second product gas streams.

In one embodiment, the second gas stream comprises 5% to 1.00% $CO_2$. In a preferred embodiment, the second gas stream comprises 20% to 100% $CO_2$, more preferably 30% to 100% $CO_2$, more preferably 37.5% to 100% $CO_2$.

In another preferred embodiment, the second gas stream comprises a $CO_2$ concentration selected from: 12.5%; 25%; 37.5%; 70% and 100%.

During the sequence of reactions, heating the metalhydroxide in the presence of $CO_2$ follows hydration. Therefore, in some embodiments, there will be some overlap between these process steps, such that water vapor is present during the heating of the metal hydroxide. Accordingly, in one embodiment, the second gas stream comprising $CO_2$ further comprises water vapor.

In one embodiment, the metal hydroxide is heated to a temperature that is at least about 10° C. higher than the normal decomposition temperature for the metal hydroxide. In a preferred embodiment, the temperature is at least about 20° C. higher than the normal decomposition temperature for the metal hydroxide; at least about 30° C. higher; at least about 40° C. higher; at least about 50° C. higher; at least about 60° C. higher; at least about 70° C. higher; at least about 80° C. higher; at least about 90° C. higher; at least about 100° C. higher; at least about 110° C. higher; at least about 120° C. higher; at least about 130° C. higher; at least about 140° C. higher; at least about 150° C. higher; at least about 160° C. higher; or at least about 170° C. higher.

In a preferred embodiment, the metal hydroxide is heated to a temperature that is at least about 50° C. higher than the normal decomposition temperature for the metal hydroxide.

In other embodiments, the temperature difference between the normal decomposition temperature of the metal hydroxide and the temperature to which the metal hydroxide is heated is selected from: 10° C.; 15° C.; 20° C.; 25° C.; 30° C.; 35° C.; 40° C.; 45° C.; 50° C.; 55° C.; 60° C.; 65° C.; 70° C.; 75° C.; 80° C.; 85° C.; 90° C.; 95° C.; 100° C.; 105° C.; 110° C.; 115° C.; 120° C.; 125° C.; 130° C.; 135° C.; 140° C.; 145° C.; 150° C.; 155° C.; 160° C.; 165° C.; 170° C.; 175° C.; and any subgroup thereof.

The upper limit of the temperature to which the metal hydroxide is heated is that temperature at which the metal hydroxide inevitably loses water to form the metal oxide.

The time the metal hydroxide spends in the thermodynamically unstable state is determined by the heating rate during any temperature increase and the length of any time at which the temperature is held constant.

In one embodiment, the metal hydroxide is heated at a rate of temperature increase from 1° C./min to 50° C./min. In a preferred embodiment, the rate of temperature increase is from 3° C./min to 18° C./min. In another preferred embodiment, the rate of temperature increase is 13° C./min.

In a preferred embodiment, the metal hydroxide is heated to a temperature from 500° C. to 620° C. In another preferred embodiment, the temperature is from 500° C. to 600° C.

In one embodiment, the metal hydroxide is held at a constant temperature above the normal decomposition temperature for a period of time. In a preferred embodiment, the temperature is from 500° C. to 620° C. In a preferred embodiment, the temperature is from 500° C. to 600° C. In another preferred embodiment, the temperature is 520° C. In a preferred embodiment, the time is from 5 minutes to 300 minutes. In another preferred embodiment, the time is from 5 minutes to 60 minutes. In another preferred embodiment, the time is from 10 minutes to 50 minutes. In another preferred embodiment, the time is from 20 minutes to 40 minutes. In another preferred embodiment, the time is 23 minutes.

In one embodiment, the total time spent by the metal hydroxide at a temperature that is higher than the normal decomposition temperature for the metal hydroxide is at least about 10 minutes.

Following heating of the metal hydroxide in the second gas stream comprising $CO_2$, the metal hydroxide is dehydrated to regenerate the metal oxide.

In one embodiment, the metal hydroxide is heated to a temperature from 500° C. to 800° C. to dehydrate the metal hydroxide and regenerate the metal oxide. In a preferred embodiment, the temperature is from 600° C. to 700° C.

Alternatively, the metal hydroxide may be dehydrated to regenerate the metal oxide by substituting the second gas stream comprising $CO_2$ with a fourth gas stream in the first and second aspects. Similarly, in the third aspect, the metal hydroxide is dehydrated to regenerate the metal oxide by substituting the second gas steam comprising $CO_2$ with a third gas stream.

In a preferred embodiment, the fourth gas stream of the first and second aspects, and the third gas stream of the third aspect, has a concentration of $CO_2$ such that the metal hydroxide dehydrates at the temperature at which that gas stream substitutes for the second gas stream.

In another embodiment, the fourth gas stream of the first and second aspects, and the third gas stream of the third aspect, does not include $CO_2$ or comprises a low concentration of $CO_2$, for example ambient air.

In a preferred embodiment, the fourth gas stream of the first and second aspects, and the third gas stream of the third aspect, comprises less than about 15% $CO_2$. In another embodiment, the gas stream comprises less than about 10% $CO_2$, less than about 5% $CO_2$, or less than about 2% $CO_2$, or less than about 1% $CO_2$.

The invention also contemplates embodiments in which the process ends at this stage, to provide a metal oxide product having an enhanced resistance to attrition and fragmentation. The metal oxide product may also comprise some metal carbonate.

In one embodiment of the first and second aspects, the fourth gas stream is the same as the third gas stream in which the resulting metal oxide is then carbonated, as described below.

Alternatively, the metal hydroxide may be further heated in the second gas stream comprising $CO_2$ until the dehydration temperature, which is a function of the water vapor pressure and $CO_2$ concentration, is reached.

In the first and second aspects, the resulting metal oxide is then carbonated in a third gas stream comprising $CO_2$ to regenerate the metal carbonate. This carbonation reaction may be performed as described above.

The third gas stream of the first and second aspects may be a separate gas stream that comprises $CO_2$. Alternatively, in one embodiment, the third gas stream is the same as the first gas stream. In this embodiment, the metal oxide captures further $CO_2$ from the first gas stream, which is then released as part of the first product gas stream when the cyclical process is repeated.

In another embodiment, the third gas stream of the first and second aspects is the same as the second gas stream. In this embodiment, the metal hydroxide may be further heated in the second gas stream until it dehydrates. The temperature is then maintained or increased to carbonate the metal oxide. In those embodiments wherein the second gas stream comprises added $CO_2$, the metal oxide captures at least part of this added $CO_2$, which is then released as part of the first product gas stream when the cyclical process is repeated.

A preferred embodiment of the invention comprises a process for separating $CO_2$ from a first gas stream comprising $CO_2$, the process comprising the steps of:
(a) calcining a metal carbonate to generate a metal oxide and produce a first product gas stream comprising $CO_2$;
(b) contacting the metal oxide with the first gas stream to carbonate the metal oxide and regenerate the metal carbonate;
(c) calcining the metal carbonate regenerated in step (b) to regenerate the metal oxide and produce a second product gas stream comprising $CO_2$;
(d) optionally repeating steps (b) and (c) using the metal oxide regenerated in step (c);
(e) contacting the metal oxide regenerated in step (c) with water to form a metal hydroxide;
(f) heating the metal hydroxide in a second gas stream comprising $CO_2$ to a temperature that is higher than the normal decomposition temperature for the metal hydroxide;
(g) dehydrating the metal hydroxide to regenerate the metal oxide;
(h) contacting the metal oxide regenerated in step (g) with a third gas stream comprising $CO_2$ to carbonate the metal oxide and regenerate the metal carbonate; and
(i) repeating steps (a) to (h) using the metal carbonate regenerated in step (h).

A further preferred embodiment of the invention comprises a process for separating $CO_2$ from a first gas stream comprising $CO_2$, the process comprising the steps of
(a) calcining a metal carbonate to generate a metal oxide and produce a first product gas stream comprising $CO_2$;
(b) contacting the metal oxide with the first gas stream to carbonate the metal oxide and regenerate the metal carbonate;
(c) calcining the metal carbonate regenerated in step (b) to regenerate the metal oxide and produce a second product gas stream comprising $CO_2$;
(d) optionally repeating steps (b) and (c) using the metal oxide regenerated in step (c);
(e) contacting the metal oxide regenerated in step (c) with water to form a metal hydroxide;
(f) heating the metal hydroxide in a second gas stream comprising $CO_2$ to a temperature that is higher than the normal decomposition temperature for the metal hydroxide, and to a temperature and for a time and at a concentration of $CO_2$ effective to suppress the dehydration of the metal hydroxide and reduce the attrition and fragmentation rates, compared to those that would otherwise occur, of the metal oxide formed upon dehydration of the metal hydroxide;
(g) dehydrating the metal hydroxide to regenerate the metal oxide;
(h) contacting the metal oxide regenerated in step (g) with a third gas stream comprising $CO_2$ to carbonate the metal oxide and regenerate the metal carbonate; and
(i) repeating steps (a) to (h) using the metal carbonate regenerated in step (h).

Another preferred embodiment of the invention comprises a process for separating $CO_2$ from a first gas stream comprising $CO_2$, the process comprising the steps of:
(a) calcining $CaCO_3$ to generate $CaO$ and produce a first product gas stream comprising $CO_2$;
(b) contacting the $CaO$ with the first gas stream to carbonate the $CaO$ and regenerate the $CaCO_3$;
(c) calcining the $CaCO_3$ regenerated in step (b) to regenerate the $CaO$ and produce a second product gas stream comprising $CO_2$;
(d) optionally repeating steps (b) and (c) using the $CaO$ regenerated in step (c);
(e) contacting the $CaO$ regenerated in step (c) with water to form $Ca(OH)_2$;
(f) heating the $Ca(OH)_2$ in a second gas stream comprising $CO_2$ to a temperature that is higher than the normal decomposition temperature for $Ca(OH)_2$;
(g) dehydrating the $Ca(OH)_2$ to regenerate the $CaO$;
(h) optionally repeating steps (e) to (g) using the $CaO$ regenerated in step (g);
(i) contacting the $CaO$ regenerated in step (g) with a third gas stream comprising $CO_2$ to carbonate the $CaO$ and regenerate the $CaCO_3$;
(j) optionally repeating steps (c) to (i) using the $CaCO_3$ regenerated in step (i); and
(k) repeating steps (a) to (j) using the $CaCO_3$ regenerated in step (i).

Another preferred embodiment of the invention comprises a process for separating $CO_2$ from a first gas stream comprising $CO_2$, the process comprising the steps of:
(a) calcining $CaCO_3$ to generate $CaO$ and produce a first product gas stream comprising $CO_2$;
(b) contacting the $CaO$ with the first gas stream to carbonate the $CaO$ and regenerate the $CaCO_3$;
(c) calcining the $CaCO_3$ regenerated in step (b) to regenerate the $CaO$ and produce a second product gas stream comprising $CO_2$;
(d) optionally repeating steps (b) and (c) using the $CaO$ regenerated in step (c);
(e) contacting the $CaO$ regenerated in step (c) with water to form $Ca(OH)_2$;
(f) heating the $Ca(OH)_2$ in a second gas stream comprising $CO_2$ to a temperature that is higher than the normal decomposition temperature for $Ca(OH)_2$, and to a temperature and for a time and at a concentration of $CO_2$ effective to suppress the dehydration of the $Ca(OH)_2$ and reduce the attrition and fragmentation rates, compared to those that would otherwise occur, of the $CaO$ formed upon dehydration of the $Ca(OH)_2$;
(g) dehydrating the $Ca(OH)_2$ to regenerate the $CaO$;
(h) optionally repeating steps (e) to (g) using the $CaO$ regenerated in step (g);
(i) contacting the $CaO$ regenerated in step (g) with a third gas stream comprising $CO_2$ to carbonate the $CaO$ and regenerate the $CaCO_3$;
(j) optionally repeating steps (c) to (i) using the $CaCO_3$ regenerated in step (i); and
(k) repeating steps (a) to (j) using the $CaCO_3$ regenerated in step (i).

Another preferred embodiment of the invention comprises a process for separating $CO_2$ from a first gas stream comprising $CO_2$, the process comprising the steps of:

(a) calcining a mixture of $CaCO_3$ and $MgCO_3$ to generate a mixture of CaO and MgO and produce a first product gas stream comprising $CO_2$;
(b) contacting the mixture of CaO and MgO with the first gas stream to carbonate mixture of CaO and MgO and regenerate the mixture of $CaCO_3$ and $MgCO_3$;
(c) calcining the mixture of $CaCO_3$ and $MgCO_3$ regenerated in step (b) to regenerate the mixture of CaO and MgO and produce a second product gas stream comprising $CO_2$;
(d) optionally repeating steps (b) and (c) using the mixture of CaO and MgO regenerated in step (c);
(e) contacting the mixture of CaO and MgO regenerated in step (c) with water to form a mixture of $Ca(OH)_2$ and $Mg(OH)_2$;
(f) heating the mixture of $Ca(OH)_2$ and $Mg(OH)_2$ in a second gas stream comprising $CO_2$ to a temperature that is higher than the normal decomposition temperature for the mixture of $Ca(OH)_2$ and $Mg(OH)_2$;
(g) dehydrating the mixture of $Ca(OH)_2$ and $Mg(OH)_2$ to regenerate the mixture of CaO and MgO;
(h) optionally repeating steps (e) to (g) using the mixture of CaO and MgO regenerated in step (g);
(i) contacting the mixture of CaO and MgO regenerated in step (g) with a third gas stream comprising $CO_2$ to carbonate the mixture of CaO and MgO and regenerate the mixture of $CaCO_3$ and $MgCO_3$;
(j) optionally repeating steps (c) to (i) using the mixture of $CaCO_3$ and $MgCO_3$ regenerated in step (i); and
(k) repeating steps (a) to (j) using the mixture of $CaCO_3$ and $MgCO_3$ regenerated in step (i).

Another preferred embodiment of the invention comprises a process for separating $CO_2$ from a first gas stream comprising $CO_2$, the process comprising the steps of:
(a) calcining a mixture of $CaCO_3$ and $MgCO_3$ to generate a mixture of CaO and MgO and produce a first product gas stream comprising $CO_2$;
(b) contacting the mixture of CaO and MgO with the first gas stream to carbonate the mixture of CaO and MgO and regenerate the mixture of $CaCO_3$ and $MgCO_3$;
(c) calcining the mixture of $CaCO_3$ and $MgCO_3$ regenerated in step (b) to regenerate the mixture of CaO and MgO and produce a second product gas stream comprising $CO_2$;
(d) optionally repeating steps (b) and (c) using the mixture of CaO and MgO regenerated in step (c);
(e) contacting the mixture of CaO and MgO regenerated in step (c) with water to form a mixture of $Ca(OH)_2$ and $Mg(OH)_2$;
(f) heating the mixture of $Ca(OH)_2$ and $Mg(OH)_2$ in a second gas stream comprising $CO_2$ to a temperature that is higher than the normal decomposition temperature for the mixture of $Ca(OH)_2$ and $Mg(OH)_2$, and to a temperature and for a time and at a concentration of $CO_2$ effective to suppress the dehydration of the mixture of $Ca(OH)_2$ and $Mg(OH)_2$ and reduce the attrition and fragmentation rates, compared to those that would otherwise occur, of the mixture of CaO and MgO formed upon dehydration of the mixture of $Ca(OH)_2$ and $Mg(OH)_2$;
(g) dehydrating the mixture of $Ca(OH)_2$ and $Mg(OH)_2$ to regenerate the mixture of CaO and MgO;
(h) optionally repeating steps (e) to (g) using the mixture of CaO and MgO regenerated in step (g);
(i) contacting the mixture of CaO and MgO regenerated in step (g) with a third gas stream comprising $CO_2$ to carbonate the mixture of CaO and MgO and regenerate the mixture of $CaCO_3$ and $MgCO_3$;
(j) optionally repeating steps (c) to (i) using the mixture of $CaCO_3$ and $MgCO_3$ regenerated in step (i); and
(k) repeating steps (a) to (j) using the mixture of $CaCO_3$ and $MgCO_3$ regenerated in step (i).

Another preferred embodiment of the invention comprises a process for separating $CO_2$ from a first gas stream comprising $CO_2$, the process comprising the steps of:
(a) calcining $CaCO_3$ to generate CaO and produce a first product gas stream comprising $CO_2$;
(b) contacting the CaO with the first gas stream to carbonate the CaO and regenerate the $CaCO_3$;
(c) calcining the $CaCO_3$ regenerated in step (b) to regenerate the CaO and produce a second product gas stream comprising $CO_2$;
(d) optionally repeating steps (b) and (c) using the CaO regenerated in step (c);
(e) contacting the CaO regenerated in step (c) with water to form $Ca(OH)_2$;
(f) heating the $Ca(OH)_2$ in a second gas stream comprising $CO_2$ to a temperature that is higher than the normal decomposition temperature for $Ca(OH)_2$;
(g) dehydrating the $Ca(OH)_2$ to regenerate the CaO;
(h) contacting the CaO regenerated in step (g) with a third gas stream comprising $CO_2$ to carbonate the CaO and regenerate the $CaCO_3$;
(i) repeating steps (a) to (h) using the $CaCO_3$ regenerated in step (h).

Another preferred embodiment of the invention comprises a process for separating $CO_2$ from a first gas stream comprising $CO_2$, the process comprising the steps of:
(a) calcining $CaCO_3$ to generate CaO and produce a first product gas stream comprising $CO_2$;
(b) contacting the CaO with the first gas stream to carbonate the CaO and regenerate the $CaCO_3$;
(c) calcining the $CaCO_3$ regenerated in step (b) to regenerate the CaO and produce a second product gas stream comprising $CO_2$;
(d) optionally repeating steps (b) and (c) using the CaO regenerated in step (c);
(e) contacting the CaO regenerated in step (c) with water to form $Ca(OH)_2$;
(f) heating the $Ca(OH)_2$ in a second gas stream comprising $CO_2$ to a temperature that is higher than the normal decomposition temperature for $Ca(OH)_2$, and to a temperature and for a time and at a concentration of $CO_2$ effective to suppress the dehydration of the $Ca(OH)_2$ and reduce the attrition and fragmentation rates, compared to those that would otherwise occur, of the CaO formed upon dehydration of the $Ca(OH)_2$;
(g) dehydrating the $Ca(OH)_2$ to regenerate the CaO;
(h) contacting the CaO regenerated in step (g) with a third gas stream comprising $CO_2$ to carbonate the CaO and regenerate the $CaCO_3$;
(i) repeating steps (a) to (h) using the $CaCO_3$ regenerated in step (h).

Another preferred embodiment of the invention comprises a process for separating $CO_2$ from a first gas stream comprising $CO_2$, the process comprising the steps of:
(a) calcining $CaCO_3$ to generate CaO and produce a first product gas stream comprising $CO_2$;
(b) contacting the CaO with the first gas stream to carbonate the CaO and regenerate the $CaCO_3$;
(c) calcining the $CaCO_3$ regenerated in step (b) to regenerate the CaO and produce a second product gas stream comprising $CO_2$;
(d) optionally repeating steps (b) and (c) using the CaO regenerated in step (c);

(e) contacting the CaO regenerated in step (c) with water vapor at an absolute humidity from 5% to 100% and at a temperature from 100° C. to 700° C. to form $Ca(OH)_2$;

(f) heating the $Ca(OH)_2$ in a second gas stream comprising from 20% to 100% $CO_2$ to a temperature from 500° C. to 620° C.;

(g) dehydrating the $Ca(OH)_2$ to regenerate the CaO by heating the $Ca(OH)_2$ to a temperature from 600° C. to 700° C.;

(h) contacting the CaO regenerated in step (g) with a third gas stream comprising $CO_2$ to carbonate the CaO and regenerate the $CaCO_3$;

(i) repeating steps (a) to (h) using the $CaCO_3$ regenerated in step (h).

Another preferred embodiment of the invention comprises a process for separating $CO_2$ from a first gas stream comprising $CO_2$, the process comprising the steps of (a) calcining $CaCO_3$ to generate CaO and produce a first product gas stream comprising $CO_2$;

(b) contacting the CaO with the first gas stream to carbonate the CaO and regenerate the $CaCO_3$;

(c) calcining the $CaCO_3$ regenerated in step (b) to regenerate the CaO and produce a second product gas stream comprising $CO_2$;

(d) optionally repeating steps (b) and (c) using the CaO regenerated in step (c);

(e) contacting the CaO regenerated in step (c) with water vapor at an absolute humidity from 5% to 100% and at a temperature from 100° C. to 700° C. to form $Ca(OH)_2$;

(f) heating the $Ca(OH)_2$ in a second gas stream comprising from 20% to 100% $CO_2$ to a temperature from 500° C. to 600° C.;

(g) dehydrating the $Ca(OH)_2$ to regenerate the CaO in a gas stream comprising less than about 15% $CO_2$;

(h) contacting the CaO regenerated in step (g) with a third gas stream comprising $CO_2$ to carbonate the CaO and regenerate the $CaCO_3$;

(i) repeating steps (a) to (h) using the $CaCO_3$ regenerated in step (h).

Another preferred embodiment of the invention comprises a process for separating $CO_2$ from a first gas stream comprising $CO_2$, the process comprising the steps of:

(a) calcining $MgCO_3$ to generate MgO and produce a first product gas stream comprising $CO_2$;

(b) contacting the MgO with the first gas stream to carbonate the MgO and regenerate the $MgCO_3$;

(c) calcining the $MgCO_3$ regenerated in step (b) to regenerate the MgO and produce a second product gas stream comprising $CO_2$;

(d) optionally repeating steps (b) and (c) using the MgO regenerated in step (c);

(e) contacting the MgO regenerated in step (c) with water to form $Mg(OH)_2$;

(f) heating the $Mg(OH)_2$ in a second gas stream comprising $CO_2$ to a temperature that is higher than the normal decomposition temperature for $Mg(OH)_2$;

(g) dehydrating the $Mg(OH)_2$ to regenerate the MgO;

(h) contacting the MgO regenerated in step (g) with a third gas stream comprising $CO_2$ to carbonate the MgO and regenerate the $MgCO_3$;

(i) repeating steps (a) to (h) using the $MgCO_3$ regenerated in step (h).

Another preferred embodiment of the invention comprises a process for separating $CO_2$ from a first gas stream comprising $CO_2$, the process comprising the steps of:

(a) calcining a mixture of $CaCO_3$ and $MgCO_3$ to generate a mixture of CaO and MgO and produce a first product gas stream comprising $CO_2$;

(b) contacting a mixture of CaO and MgO with the first gas stream to carbonate the mixture of CaO and MgO and regenerate the mixture of $CaCO_3$ and $MgCO_3$;

(c) calcining the mixture of $CaCO_3$ and $MgCO_3$ regenerated in step (b) to regenerate the mixture of CaO and MgO and produce a second product gas stream comprising $CO_2$;

(d) optionally repeating steps (b) and (c) using the mixture of CaO and MgO regenerated in step (c);

(e) contacting a mixture of CaO and MgO regenerated in step (c) with water to form a mixture of $Ca(OH)_2$ and $Mg(OH)_2$;

(f) heating the mixture of $Ca(OH)_2$ and $Mg(OH)_2$ in a second gas stream comprising $CO_2$ to a temperature that is higher than the normal decomposition temperature for the mixture of $Ca(OH)_2$ and $Mg(OH)_2$;

(g) dehydrating the mixture of $Ca(OH)_2$ and $Mg(OH)_2$ to regenerate the mixture of CaO and MgO;

(h) contacting the mixture of CaO and MgO regenerated in step (g) with a third gas stream comprising $CO_2$ to carbonate the mixture of CaO and MgO and regenerate the mixture of $CaCO_3$ and $MgCO_3$;

(i) repeating steps (a) to (h) using the mixture of $CaCO_3$ and $MgCO_3$ regenerated in step (h).

Another preferred embodiment of the invention comprises a process for separating $CO_2$ from a first gas stream comprising $CO_2$, the process comprising the steps of:

(a) calcining a mixture of $CaCO_3$ and $MgCO_3$ to generate a mixture of CaO and MgO and produce a first product gas stream comprising $CO_2$;

(b) contacting a mixture of CaO and MgO with the first gas stream to carbonate the mixture of CaO and MgO and regenerate the mixture of $CaCO_3$ and $MgCO_3$;

(c) calcining the mixture of $CaCO_3$ and $MgCO_3$ regenerated in step (b) to regenerate the mixture of CaO and MgO and produce a second product gas stream comprising $CO_2$;

(d) optionally repeating steps (b) and (c) using the mixture of CaO and MgO regenerated in step (c);

(e) contacting a mixture of CaO and MgO regenerated in step (c) with water to form a mixture of $Ca(OH)_2$ and $Mg(OH)_2$;

(f) heating the mixture of $Ca(OH)_2$ and $Mg(OH)_2$ in a second gas stream comprising $CO_2$ to a temperature that is higher than the normal decomposition temperature for the mixture of $Ca(OH)_2$ and $Mg(OH)_2$, and to a temperature and for a time and at a concentration of $CO_2$ effective to suppress the dehydration of the mixture of $Ca(OH)_2$ and $Mg(OH)_2$ and reduce the attrition and fragmentation rates, compared to those that would otherwise occur, of the mixture of CaO and MgO formed upon dehydration of the mixture of $Ca(OH)_2$ and $Mg(OH)_2$;

(g) dehydrating the mixture of $Ca(OH)_2$ and $Mg(OH)_2$ to regenerate the mixture of CaO and MgO;

(h) contacting the mixture of CaO and MgO regenerated in step (g) with a third gas strewn comprising $CO_2$ to carbonate the mixture of CaO and MgO and regenerate the mixture of $CaCO_3$ and $MgCO_3$;

(i) repeating steps (a) to (h) using the mixture of $CaCO_3$ and $MgCO_3$ regenerated in step (h).

Another preferred embodiment of the invention comprises a process for separating $CO_2$ from a first gas stream comprising $CO_2$, the process comprising the steps of:

(a) calcining a mixture of $CaCO_3$ and $MgCO_3$ to generate a mixture of CaO and MgO and produce a first product gas stream comprising $CO_2$;

(b) contacting the mixture of CaO and MgO with the first gas stream to carbonate the mixture of CaO and MgO and regenerate the mixture of $CaCO_3$ and $MgCO_3$;

(c) calcining the mixture of $CaCO_3$ and $MgCO_3$ regenerated in step (b) to regenerate the mixture of CaO and MgO and produce a second product gas stream comprising $CO_2$;

(d) optionally repeating steps (b) and (c) using the mixture of CaO and MgO regenerated in step (c);

(e) contacting the mixture of CaO and MgO regenerated in step (c) with water vapor at an absolute humidity from 5% to 100% and at a temperature from 100° C. to 700° C. to forms a mixture of $Ca(OH)_2$ and $Mg(OH)_2$;

(f) heating the mixture of $Ca(OH)_2$ and $Mg(OH)_2$ in a second gas stream comprising from 20% to 100% $CO_2$ to a temperature from 500° C. to 620° C.;

(g) dehydrating the mixture of $Ca(OH)_2$ and $Mg(OH)_2$ to regenerate the mixture of CaO and MgO by heating the mixture of $Ca(OH)_2$ and $Mg(OH)_2$ to a temperature from 600° C. to 700° C.;

(h) contacting the mixture of CaO and MgO regenerated in step (g) with a third gas stream comprising $CO_2$ to carbonate the mixture of CaO and MgO and regenerate the mixture of $CaCO_3$ and $MgCO_3$;

(i) repeating steps (a) to (h) using the mixture of $CaCO_3$ and $MgCO_3$ regenerated in step (h).

The mechanism of decomposition of $Ca(OH)_2$ is thought to proceed via several steps (O. Chaix-Pluchery et al. *J. Solid State Chem.* 50 (1983) 247-255), Initially, as the $Ca(OH)_2$ is heated below the normal decomposition temperature, hydrogen atoms detach to form mobile protons which then attach to hydroxide ions to form water molecules. As the temperature is further increased these water molecules aggregate into water rich zones and eventually escape from the crystal via channels or pathways in the crystal lattice. In the presence of proton donor molecules, such as chemisorbed water, the normal decomposition temperature can be elevated by many tens of degrees.

Chemisorbed water may be formed in the presence of $CO_2$ gas during the dehydration of the $Ca(OH)_2$, which may result in the significant elevation of the decomposition temperature observed in the Examples.

The present applicants have determined that, in the presence of a gas effective to suppress the dehydration of the metal hydroxide, the temperature at which the metal hydroxide dehydrates is elevated with respect to the dehydration temperature in the absence of the gas.

Accordingly, the invention contemplates alternative embodiments in which the metal hydroxide is subjected to dehydration at an elevated temperature by heating in an atmosphere comprising an acidic gas, which acts as a proton donor or induces the formation of proton donors. In such an atmosphere, the metal hydroxide may be heated to a temperature above that at which it normally dehydrates.

In one embodiment, the acidic gas comprises a gas selected from the group consisting of: $H_2O$; $CO_2$; $SO_2$; $SO_x$; $NO_2$; and $NO_x$; and mixtures of any two or more thereof. The acid gas may be a mixture of an acid gas together with other, non-acid gases.

In one embodiment, the heating of $Ca(OH)_2$ in the presence of an acid gas, which is in contact with the $Ca(OH)_2$ from temperatures well below the normal dehydration temperature of 445° C., results in an increase in the dehydration temperature and reduced attrition and fragmentation in a fluidized bed reactor.

Accordingly, in a fourth aspect, the present invention provides a process for separating $CO_2$ from a first gas stream comprising $CO_2$, the process comprising the steps of:

(a) calcining a metal carbonate to generate a metal oxide and produce a first product gas stream comprising $CO_2$;

(b) contacting the metal oxide with the first gas stream to carbonate the metal oxide and regenerate the metal carbonate;

(c) calcining the metal carbonate regenerated in step (b) to regenerate the metal oxide and produce a second product gas stream comprising $CO_2$;

(d) optionally repeating steps (b) and (c) using the metal oxide regenerated in step (c);

(e) contacting the metal oxide regenerated in step (c) with water to form a metal hydroxide;

(f) heating the metal hydroxide in a second gas stream, wherein the second gas stream comprises a gas effective to suppress the dehydration of the metal hydroxide, to a temperature that is higher than the normal decomposition temperature for the metal hydroxide;

(g) dehydrating the metal hydroxide to regenerate the metal oxide;

(h) optionally repeating steps (e) to (g) using the metal oxide regenerated in step (g);

(i) contacting the metal oxide regenerated in step (g) with a third gas stream comprising $CO_2$ to carbonate the metal oxide and regenerate the metal carbonate;

(j) optionally repeating steps (c) to (i) using the metal carbonate regenerated in step (i); and (k) repeating steps (a) to (j) using the metal carbonate regenerated in step (i).

In a fifth aspect, the present invention provides a process for separating $CO_2$ from a first gas stream comprising $CO_2$, the process comprising the steps of:

(a) calcining a metal carbonate to generate a metal oxide and produce a first product gas stream comprising $CO_2$;

(b) contacting the metal oxide with the first gas stream to carbonate the metal oxide and regenerate the metal carbonate;

(c) calcining the metal carbonate regenerated in step (b) to regenerate the metal oxide and produce a second product gas stream comprising $CO_2$;

(d) optionally repeating steps (b) and (c) using the metal oxide regenerated in step (c);

(e) contacting the metal oxide regenerated in step (c) with water to form a metal hydroxide;

(f) heating the metal hydroxide in a second gas stream, wherein the second gas stream comprises a gas effective to suppress the dehydration of the metal hydroxide, to a temperature that is higher than the normal decomposition temperature for the metal hydroxide, and to a temperature and for a time and at a concentration of the gas effective to suppress the dehydration of the metal hydroxide and reduce the attrition and fragmentation rates, compared to those that would otherwise occur, of the metal oxide formed upon dehydration of the metal hydroxide;

(g) dehydrating the metal hydroxide to regenerate the metal oxide;

(h) optionally repeating steps (e) to (g) using the metal oxide regenerated in step (g);

(i) contacting the metal oxide regenerated in step (g) with a third gas stream comprising $CO_2$ to carbonate the metal oxide and regenerate the metal carbonate;

(j) optionally repeating steps (c) to (i) using the metal carbonate regenerated in step (i); and (k) repeating steps (a) to (j) using the metal carbonate regenerated in step (i).

In a sixth aspect, the present invention provides a process for producing a metal oxide by dehydrating a metal hydroxide, the process comprising heating the metal hydroxide in a gas stream, wherein the gas stream comprises a gas effective to suppress the dehydration of the metal hydroxide, to a temperature higher than the normal dehydration temperature for the metal hydroxide, and dehydrating the metal hydroxide to obtain the metal oxide.

In a seventh aspect, the present invention provides a process for restoring the ability of a metal oxide to react with $CO_2$, wherein the metal oxide is used in a cyclic process, wherein the metal oxide is reacted with $CO_2$ to form a metal carbonate and the metal carbonate is calcined to regenerate the metal oxide, the process comprising the steps of:
(a) contacting the metal oxide with water to form a metal hydroxide;
(b) heating the metal hydroxide in a gas stream, wherein the gas stream comprises a gas effective to suppress the dehydration of the metal hydroxide, to a temperature higher than the normal dehydration temperature for the metal hydroxide; and
(c) dehydrating the metal hydroxide to regenerate the metal oxide.

In a preferred embodiment, the gas effective to suppress the dehydration of the metal hydroxide is an acidic gas. In one embodiment, the acidic gas comprises a gas selected from the group consisting of: $H_2O$; $CO_2$; $SO_2$; $SO_x$; $NO_2$; and $NO_x$; and mixtures of any two or more thereof.

In a preferred embodiment, the acidic gas is $CO_2$.

Other preferred embodiments of the fourth to seventh aspects of the invention incorporate features of the various embodiments of the first to third aspects of the invention described above.

A preferred embodiment of the present invention comprises a process for producing CaO by dehydrating $Ca(OH)_2$, the process comprising heating $Ca(OH)_2$ in a gas stream comprising $CO_2$ to a temperature higher than the normal dehydration temperature of $Ca(OH)_2$, and dehydrating the $Ca(OH)_2$ to obtain CaO.

A further preferred embodiment of the present invention comprises a process for producing MgO by dehydrating $Mg(OH)_2$, the process comprising heating $Mg(OH)_2$ in a gas stream comprising $CO_2$ to a temperature higher than the normal dehydration temperature of $Mg(OH)_2$, and dehydrating the $Mg(OH)_2$ to obtain MgO.

Another preferred embodiment of the present invention comprises a process for producing a mixture of CaO and MgO by dehydrating a mixture of $Ca(OH)_2$ and $Mg(OH)_2$, the process comprising heating a mixture of $Ca(OH)_2$ and $Mg(OH)_2$ in a gas stream comprising $CO_2$ to a temperature higher than the normal dehydration temperature of the mixture of $Ca(OH)_2$ and $Mg(OH)_2$, and dehydrating the mixture of $Ca(OH)_2$ and $Mg(OH)_2$ to obtain a mixture of CaO and MgO.

Another preferred embodiment of the present invention comprises a process for producing CaO by dehydrating $Ca(OH)_2$, the process comprising heating $Ca(OH)_2$ in a gas stream comprising 20% to 100% $CO_2$ to a temperature from 500° C. to 620° C., and dehydrating the $Ca(OH)_2$ to obtain CaO.

Another preferred embodiment of the present invention comprises a process for producing a mixture of CaO and MgO by dehydrating a mixture of $Ca(OH)_2$ and $Mg(OH)_2$, the process comprising heating a mixture of $Ca(OH)_2$ and $Mg(OH)_2$ in a gas stream comprising 20% to 100% $CO_2$ to a temperature from 500° C. to 620° C., and dehydrating the mixture of $Ca(OH)_2$ and $Mg(OH)_2$ to obtain a mixture of CaO and MgO.

Another preferred embodiment of the present invention comprises a process for restoring the ability of CaO to absorb, $CO_2$, wherein the CaO is used in a cyclic process, wherein the CaO is reacted with $CO_2$ to form $CaCO_3$ and $CaCO_3$ is calcined to regenerate CaO, the process comprising the steps of:
(a) contacting CaO with water to form $Ca(OH)_2$;
(b) heating the $Ca(OH)_2$ in a gas stream comprising $CO_2$ to a temperature higher than the normal dehydration temperature of $Ca(OH)_2$; and
(c) dehydrating the $Ca(OH)_2$ to regenerate the CaO.

Another preferred embodiment of the present invention comprises a process for restoring the ability of MgO to absorb $CO_2$, wherein the MgO is used in a cyclic process, wherein the MgO is reacted with $CO_2$ to form $MgCO_3$ and $MgCO_3$ is calcined to regenerate MgO, the process comprising the steps of:
(a) contacting MgO with water to form $Mg(OH)_2$;
(b) heating the $Mg(OH)_2$ in a gas stream comprising $CO_2$ to a temperature higher than the normal dehydration temperature of $Mg(OH)_2$; and
(c) dehydrating the $Mg(OH)_2$ to regenerate the MgO.

Another preferred embodiment of the present invention comprises a process for restoring the ability of a mixture of CaO and MgO to absorb $CO_2$, wherein the mixture of CaO and MgO is used in a cyclic process, wherein the mixture of CaO and MgO is reacted with $CO_2$ to form a mixture of $CaCO_3$ and $MgCO_3$ and the mixture of $CaCO_3$ and $MgCO_3$ is calcined to regenerate the mixture of CaO and MgO, the process comprising the steps of:
(a) contacting a mixture of CaO and MgO with water to form a mixture of $Ca(OH)_2$ and $Mg(OH)_2$;
(b) heating the mixture of $Ca(OH)_2$ and $Mg(OH)_2$ in a gas stream comprising $CO_2$ to a temperature $CO_2$ to a temperature higher than the normal dehydration temperature of the mixture of $Ca(OH)_2$ and $Mg(OH)_2$ in the absence of $CO_2$; and
(c) dehydrating the mixture of $Ca(OH)_2$ and $Mg(OH)_2$ to regenerate the mixture of CaO and MgO.

Another preferred embodiment of the present invention comprises a process for restoring the ability of a CaO to absorb $CO_2$, wherein the CaO is used in a cyclic process, wherein the CaO is reacted with $CO_2$ to form $CaCO_3$ and $CaCO_3$ is calcined to regenerate CaO, the process comprising the steps of:
(a) contacting CaO with water to form $Ca(OH)_2$;
(b) heating the $Ca(OH)_2$ in a gas stream comprising 20% to 100% $CO_2$ to a temperature from 500° C. to 620° C.; and
(c) dehydrating the $Ca(OH)_2$ to regenerate the CaO.

Another preferred embodiment of the present invention comprises a process for restoring the ability of a mixture of CaO and MgO to absorb $CO_2$, wherein the mixture of CaO and MgO is used in a cyclic process, wherein the mixture of CaO and MgO is reacted with $CO_2$ to form a mixture of $CaCO_3$ and $MgCO_3$ and the mixture of $CaCO_3$ and $MgCO_3$ is calcined to regenerate the mixture of CaO and MgO, the process comprising the steps of:
(a) contacting a mixture of CaO and MgO with water to form a mixture of $Ca(OH)_2$ and $Mg(OH)_2$;
(b) heating the mixture of $Ca(OH)_2$ and $Mg(OH)_2$ in a gas stream comprising 20% to 100% $CO_2$ to a temperature from 500° C. to 620° C.; and
(c) dehydrating the mixture of $Ca(OH)_2$ and $Mg(OH)_2$ to regenerate the mixture of CaO and MgO.

In another aspect, the present invention provides apparatus adapted to perform the process of the invention.

The following non-limiting examples are provided to illustrate the present invention and in no way limit the scope thereof.

EXAMPLES

Some of the experiments described below were carried out in a fluidized bed reactor with a bed volume of 1.2 liters and diameter of 8.1 cm. Gases of controlled composition and flow rate were supplied to the bottom of the temperature controlled fluidized bed reactor. The temperature of the fluidized bed was monitored, and the flow rates of the emitted gases were measured with mass flow meters. The elutriated solids were separated from the gas flow in a cyclone. Water output from the reactor was condensed in a water trap. A schematic diagram of the fluidized bed reactor is shown in FIG. 1.

Other experiments were performed in using an experimental setup identical to that shown in FIG. 1, but using a smaller reactor. These experiments have the prefix P. The diameter of the reactor used for these experiments was 32 mm and the bed volume was about 0.13 liters. Unless otherwise specified, all of the gas proportions were kept constant compared to the experiments in the larger reactor. The reaction times for the experiments in the small reactor were typically shorter that those in the large reactor because of the reduced bed volume.

Limestone was supplied by Taylors Lime, Makareao, Otago, New Zealand. The limestone was sieved, washed and then sieved between 300-600 μm.

A typical experiment consisted of repeated reaction cycles. Each reaction cycle started with CaO which was first hydrated, then dehydrated, then carbonated and finally calcined so that the resulting solid was also CaO. The hydration of the CaO was carried out with a flowing mixture of water vapor (about 20%) and $N_2$ at 400° C. Unless otherwise specified, dehydration under fluidized bed conditions was carried out in a flow of $N_2$ at 450-650° C. Carbonation was performed in a flow of $CO_2$ (20%) and $N_2$ at 650° C. in the large reactor and, unless otherwise specified, in a flow of $CO_2$ (37.5%) in $N_2$ at 620° C. in the small reactor. Calcination was performed in flowing $N_2$ under reduced pressure at 805° C.

At the end of the reaction cycle, the solid was discharged and sieved, and the fines (<150 μm) removed from the bulk of the solid and put aside. The fines that had elutriated were recovered from the cyclone and the pipe leading to it.

Initial Experiment

Figure 2:
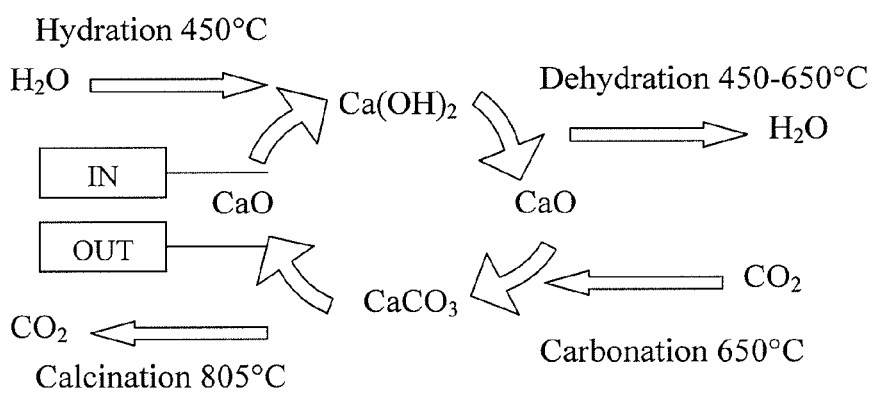
FIG. 2 shows a calcination-hydration-dehydration-carbonation reaction cycling regime using CaO as a $CO_2$ sorbent.

The initial experiment involved cycling a CaO sorbent in a fluidized bed through successive calcination-hydration-dehydration-carbonation reaction cycles and measuring the rates, the extent of the reactions, and the degree of fragmentation during the cycling. A sample was taken at the completion of every reaction cycle and examined for particle size distribution. The reaction cycling regime is shown in FIG. 2.

Figure 3:
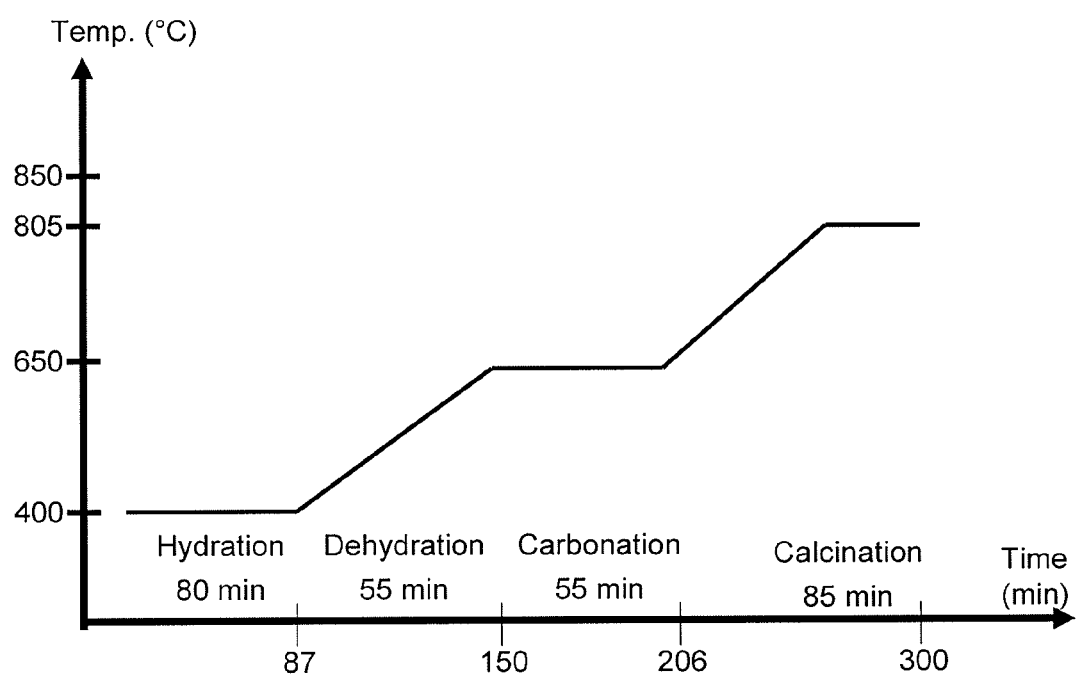
FIG. 3 shows the temperature profile as a function of time for a calcination-hydration-dehydration-carbonation reaction cycle using CaO as a $CO_2$ sorbent.

An experiment (Cycle 4) comprising five reaction cycles was conducted. The sample was calcined at 805° C. and at reduced pressure. The temperature profile as a function of time for Cycle 4 is shown in FIG. 3.

Results and Discussion
Fragmentation Results

The cycled sorbent was sieved and separated into three categories:
- 150-300 μm: these were not initially present in the sorbent and are, therefore, the product of fragmentation;
- less than 150 μm: fines that remain within the bed throughout the reaction cycles; and
- elutriated particles: particles collected in the cyclone after each reaction cycle.

Table 1 illustrates the generation of fines under Cycle 4 reaction conditions expressed as cumulative percentages.

The amount of fines produced during each reaction cycle increased with time. The amount of elutriated particles (captured in the cyclone) remained reasonably constant for each reaction cycle under Cycle 4 reaction conditions, while the fines produced that stay in the bulk increased with time.

TABLE 1

Fines accumulation under Cycle 4 reaction conditions.

| Calcination | Cumulative Percentages | | | |
|---|---|---|---|---|
| | 150-300 | <150 | Cyclone | Total Fines |
| 1 | 1.3 | 0.4 | 0.5 | 0.9 |
| | | +0.8 | +0.5 | +1.3 |
| 2 | 2.6 | 1.2 | 1.0 | 2.2 |
| | | +0.7 | +0.6 | +1.3 |
| 3 | 4.0 | 1.9 | 1.6 | 3.5 |
| | | +0.8 | +0.5 | +1.3 |
| 4 | 4.8 | 2.7 | 2.1 | 4.8 |
| | | +0.9 | +0.6 | +1.5 |
| 5 | 6.4 | 3.6 | 2.7 | 6.3 |
| | | +1.1 | +0.8 | +1.9 |
| 6 | 7.6 | 4.7 | 3.5 | 8.2 |
| Final | 7.6 | 5.2 | 3.5 | 8.7 |

The rate of fragmentation based on the amount of sorbent lost to fines implies a lifetime of 40-50 cycles for the sorbent under Cycle 4 reaction conditions. The data in Table 1 show that the hydration step results in substantial fragmentation of the sorbent.

Reaction Conversions
Hydration

The total amount of water captured by the sorbent was determined from the amount of water released during dehydration and captured in the water trap; however this is a fairly imprecise method. The length of the run was determined by the variation of measured water vapor pressure with time.

Carbonation

The amount of $CO_2$ actually released was determined from the mass flow meters and calibrated by assuming that the first calcination corresponded to a 100% release of $CO_2$ because the initial sample was completely carbonated.

Table 2 shows the extent of $CO_2$ release for each cycle and the extent of hydration on the preceding cycle.

TABLE 2

$CO_2$ capture under Cycle 4 reaction conditions.

| Calcination | % $CO_2$ Capture | % Previous Hydration |
|---|---|---|
| 1 | 100 | Nil |
| 2 | 89 | >55 |
| 3 | 70 | 76 |
| 4 | 80 | 67 |
| 5 | 73 | 59 |
| 6 | 68 | 60 |

Further Fragmentation Experiments and Intermittent Hydration

Results from the experiments under Cycle 4 reaction conditions showed that a hydration step in every cycle reduced the cycling life of the sorbent by expansion, vesiculation and weakening of the sorbent particles, inducing fragmentation.

Figure 4:
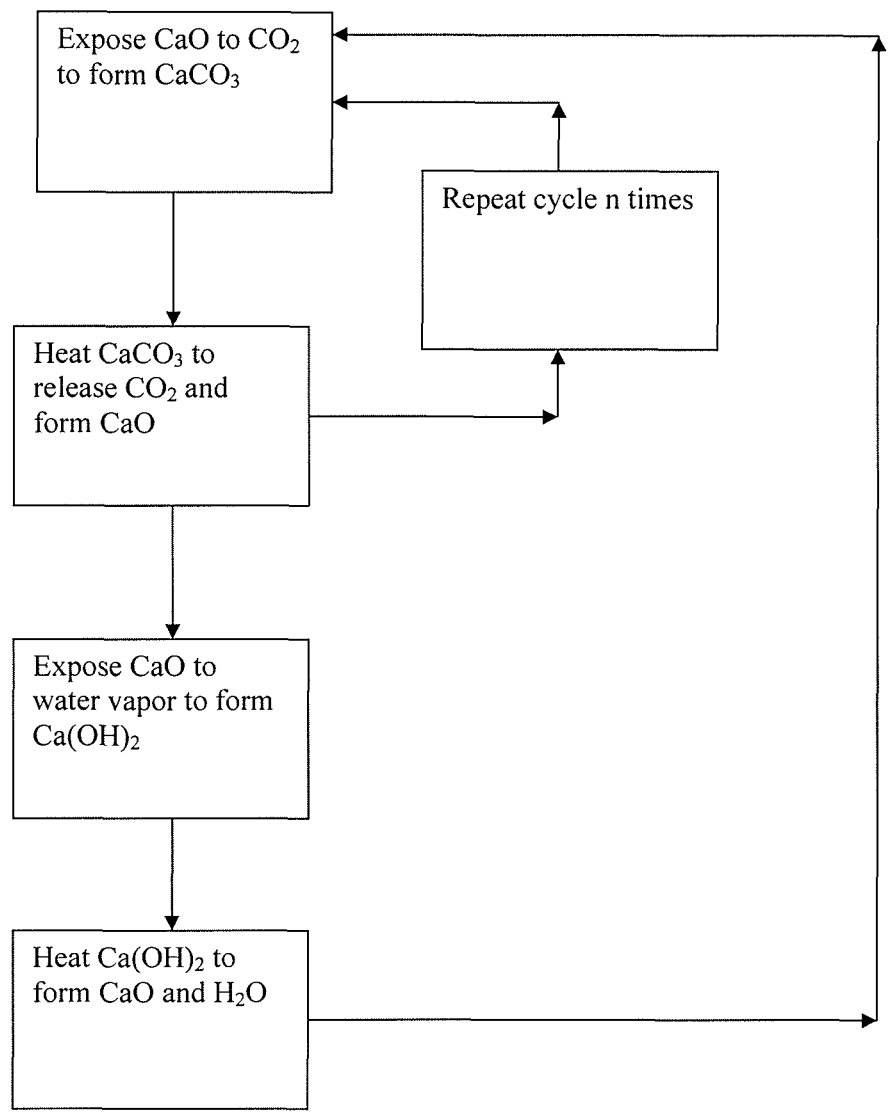
FIG. 4 shows a calcination-carbonation reaction cycling regime using CaO as a $CO_2$ sorbent with intermittent hydration.

A further experiment was conducted that involved cycling a lime sorbent in a fluidized bed through successive calcination-hydration-dehydration-carbonation cycles. However, in this experiment (Cycle 5), the hydration was on an intermittent basis. A hydration/dehydration was performed on every third carbonation/calcination cycle. The reaction cycling regime is shown in FIG. 4.

Figure 5:
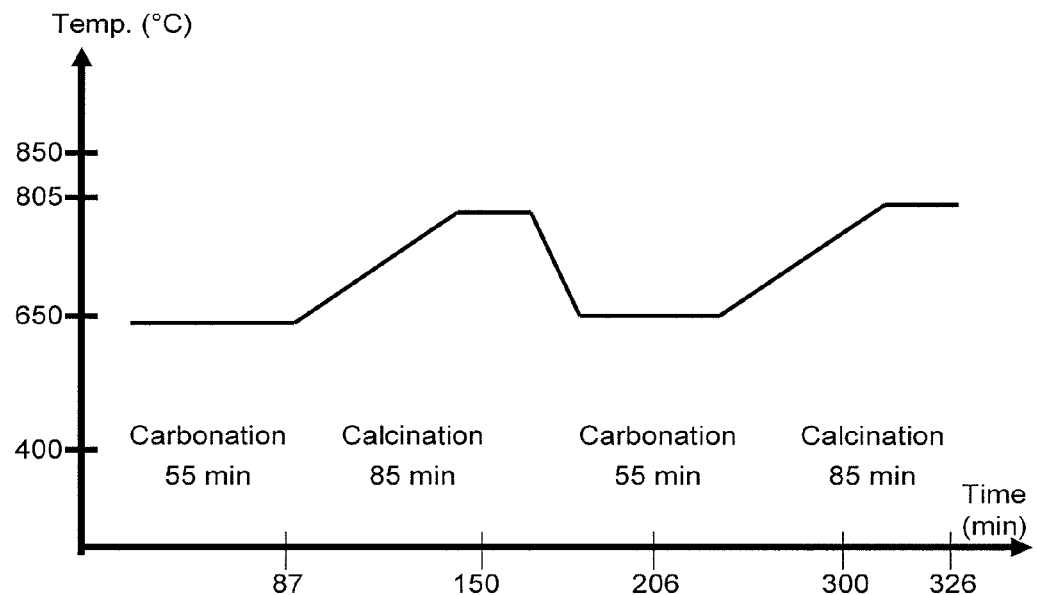
FIG. 5 shows the temperature profile as a function of time for a calcination-carbonation reaction cycle using CaO as a $CO_2$ sorbent.

The temperature profile as a function of time is shown in FIG. 5 for those carbonation/calcination cycles in which there was not a hydration step. For those carbonation/calcination cycles in which there was a hydration step, the temperature profile as a function of time was that shown in FIG. 3. So the overall sequence for Cycle 5 was two carbonation-calcination reaction cycles according to the temperature profile shown in FIG. 5, followed by one hydration-dehydration-carbonation-calcination reaction cycle according to the temperature profile shown in FIG. 3 and so on.

Table 3 illustrates the generation of fines under Cycle 5 reaction conditions expressed as cumulative percentages.

TABLE 3

Fines accumulation under Cycle 5 reaction conditions.

| | Cumulative Percentages | | | |
|---|---|---|---|---|
| | 150-300 | <150 | Cyclone | Total Fines |
| Calcination | | | | |
| 2 | 2.7 | 0.5 | 0.8 | 1.2 |
| 4 | 6.0 | 0.7 | 1.0 | 1.7 |
| Hydration | | | | |
| 5 | 4.4 | 1.1 | 1.5 | 2.6 |
| 7 | 4.8 | 1.5 | 1.6 | 3.1 |
| Hydration | | | | |
| 8 | 7.1 | 2.3 | 2.6 | 4.9 |
| 10 | 7.6 | 3.3 | 3.0 | 6.3 |
| Final | 7.6 | 3.3 | 3.0 | 6.3 |

Reaction conversions under Cycle 5 reaction conditions are shown in Table 4.

TABLE 4

$CO_2$ capture under Cycle 5 reaction conditions.

| Calcination | % $CO_2$ Capture | % Previous Hydration |
|---|---|---|
| 1 | 100 | |
| 2 | 79 | 0 |
| 3 | >50 | 0 |
| 4 | 58 | 0 |
| 5 | 65 | 67 |
| 6 | 52 | 0 |
| 7 | 48 | 0 |
| 8 | 63 | 71 |
| 9 | >30 | — |
| 10 | 39 | — |

Discussion

The data in Table 3 show that most of fines are created during the hydration/dehydration steps, which is consistent with the experiments using the Cycle 4 reaction conditions.

The intermittent hydration utilized under Cycle 5 reaction conditions provided good results, in which an average sorbent activity of 61% was maintained over 9 carbonation/calcination cycles, while only 6.3% of the material was lost to fines. This was a significant improvement over the Cycle 4 reactions conditions, which included a hydration step in every cycle. While the Cycle 4 reaction conditions retained a higher sorbent activity of around 70%, 8.7% of the sorbent material was lost to fines after five reaction cycles.

These results demonstrate that intermittent hydration results in a minimal loss of sorbent activity and a considerable reduction in fragmentation rates compared to periodic hydration. The rate of fragmentation based on the amount of sorbent lost to fines implies a lifetime of 130 cycles for the sorbent under Cycle 5 reaction conditions.

Further Experiments on Different Limestone Materials

The experiments under Cycle 4 and Cycle 5 reaction conditions described above were repeated on sorbent material from a different part of the Taylors Lime quay. These experiments were designated Cycle 8 and Cycle 7. These experiments demonstrated the general applicability of the reaction conditions described above in reducing fragmentation of the sorbent while also maintaining high levels of $CO_2$ absorption activity.

The Cycle 7 experiment subjected limestone material to the same intermittent hydration conditions as Cycle 5. The fragmentation results are shown in Table 5 and the reaction conversions in Table 6.

TABLE 5

Fines accumulation under Cycle 7 reaction conditions.

| | | Cumulative Percentages | | |
|---|---|---|---|---|
| Calcination | 150-300 | <150 | Cyclone | Total Fines |
| 2 | 3.0 | 1.3 | 0.6 | 1.9 |
| 4 | 4.3 | 1.8 | 1.0 | 2.8 |
| Hydration | | | | |
| 5 | 5.7 | 2.3 | 2.0 | 4.3 |
| Final | 5.7 | 2.3 | 2.0 | 4.3 |

TABLE 6

$CO_2$ capture under Cycle 7 reaction conditions.

| Carbonation | % $CO_2$ Capture |
|---|---|
| 1 | 100 |
| 2 | 76 |
| 3 | 70 |
| 4 | 68 |

The Cycle 8 experiment subjected the limestone to the same periodic hydration conditions as Cycle 4, in which there was a hydration step after every calcination. The final reaction cycle of this experiment included a modified dehydration step in which the $Ca(OH)_2$ was dehydrated in a stream of $CO_2$ (20%) and $N_2$. The same temperature profile shown in FIG. 3 was used for the modified dehydration step, but the flow of $CO_2$ was started at minute 87 and maintained through to minute 206. This modification of the reaction conditions reduced the fragmentation levels.

Table 7 illustrates the generation of fines for Cycle 8 reaction conditions expressed as cumulative percentages. D/K signifies the modified dehydration step.

TABLE 7

Fines accumulation under Cycle 7 reaction conditions.

| | | Cumulative Percentages | | |
|---|---|---|---|---|
| Cycle | 150-300 | <150 | Cyclone | Total Fines |
| 1 | 2.3 | 1.0 | 1.3 | 2.3 |
| 2 | 4.2 | 2.4 | 2.2 | 4.6 |
| 3 | 5.9 | 3.7 | 4.0 | 7.7 |
| 4 | 7.5 | 5.0 | 5.1 | 10.1 |
| D/K | | | | |
| 5 | 8.5 | 5.9 | 5.9 | 11.8 |
| Final | 8.5 | 6.4 | 5.9 | 12.3 |

Reaction conversions under Cycle 8 reaction conditions are shown in Table 8.

TABLE 8

CO$_2$ capture under Cycle 8 reaction conditions.

| Calcination | % CO$_2$ Capture | % Previous Hydration |
|---|---|---|
| 1 | 100 | 0 |
| 2 | 77 | 56 |
| 3 | 63 | 68 |
| 4 | 77 | 66 |
| 5 | 51 | 59 |

Discussion

Figure 6:
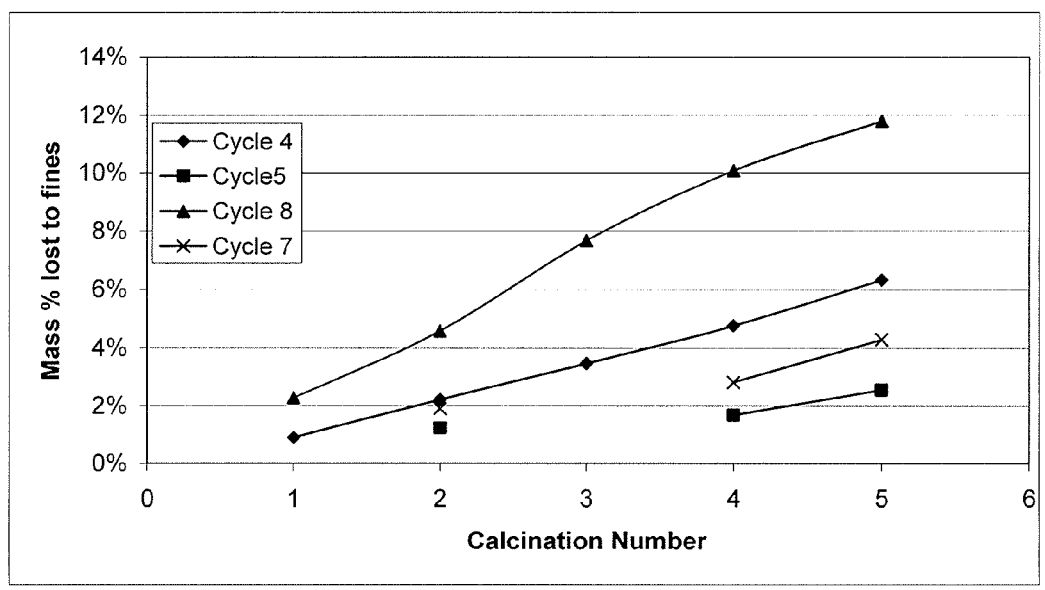
FIG. 6 shows the cumulative fragmentation for CaO as a $CO_2$ sorbent over several calcination-hydration-dehydration-carbonation reaction cycles and calcination-carbonation reaction cycles with intermittent hydration.

Table 9 and FIG. 6 compare the fragmentation results, as shown in Tables 1 and 3, for Cycle 4 reaction conditions (periodic hydration—hydration after every calcination) and Cycle 5 reaction conditions (intermittent hydration—hydration after every three carbonation-calcination reaction cycles). The sorbent materials used for the experiments under Cycle 4 and Cycle 5 reaction conditions were sourced from the same part of the quarry. Also compared are the fragmentation results, as shown in Tables 7 and 5, for Cycle 8 reaction conditions (periodic hydration—hydration after every calcination) and Cycle 7 reaction conditions (intermittent hydration—hydration after every three carbonation-calcination reaction cycles). The sorbent materials used for the experiments under Cycle 8 and Cycle 7 reaction conditions were sourced from the same part of the quarry.

Table 9 shows the normalized amount of fines at different points of the reaction cycles expressed as cumulative percentages.

TABLE 9

Fines accumulation under Cycle 4, 5, 7 and 8 reaction conditions.

| Calcination | Cycle 4 Periodic | Cycle5 Intermittent | Cycle 8 Periodic | Cycle 7 Intermittent |
|---|---|---|---|---|
| 1 | 0.9% | | 2.3% | |
| 2 | 2.2% | 1.2% | 4.6% | 1.9% |
| 3 | 3.5% | | 7.7% | |
| 4 | 4.8% | 1.7% | 10.1% | 2.8% |
| 5 | 6.3% | 2.6% | 11.8% | 4.3% |
| Ratio | 4/5 | 2.46 | 8/7 | 2.75 |

The fragmentation results show that reaction conditions utilizing intermittent hydration result in reduced fragmentation levels for both limestones when compared to reaction conditions utilizing periodic hydration.

Table 10 shows the reaction conversions under the different reaction conditions for the different sorbents,

TABLE 10

CO$_2$ capture under Cycle 4, 5, 7 and 8 reaction conditions.

| Calcination | Cycle 4 | Cycle 8 | Cycle 5 | Cycle 7 |
|---|---|---|---|---|
| 1 | 84% | 88% | 92% | 100% |
| 2 | 74% | 76% | 76% | 76% |
| 3 | 70% | 74% | 64% | 70% |

The Modified Dehydration Step

Figure 7:
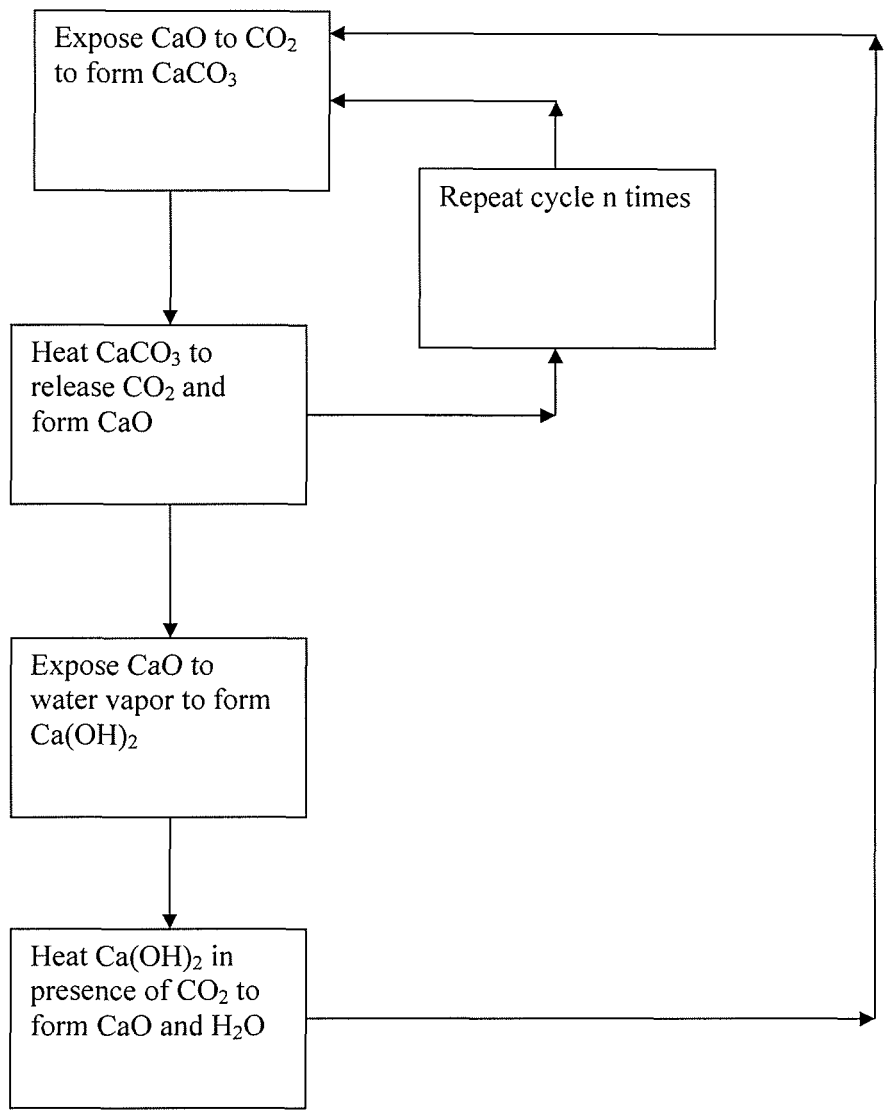
FIG. 7 shows a calcination-carbonation reaction cycling regime using CaO as a $CO_2$ sorbent with intermittent hydration and dehydration under $CO_2$.

The following experiments utilized the modified dehydration step that was used in the final cycle under Cycle 8 reaction conditions. In this step, 20% CO$_2$ was added to the N$_2$ present during the dehydration. The conditions are otherwise identical to the dehydration conditions utilized above. The reaction cycling regime is shown in FIG. 7.

Two experiments investigated the effects of the modified dehydration step in the small fluidized bed reactor described above. The experiments were conducted for 22 calcinations. In one experiment (Cycle P1), the reaction conditions were identical to Cycle 5 and used the same material in a reaction sequence including intermittent hydration (hydration every three calcinations). The other experiment (Cycle P2) used the same material in a reaction sequence including intermittent hydration (every three calcinations) but the hydration was followed by a modified dehydration step, instead of the conventional dehydration step used in Cycle P1.

The reaction times for Cycles P1 and P2 were shorter than those for Cycle 5 because of the reduced bed volume in the small reactor and were:

calcination: 36 minutes
carbonation: 23 minutes
hydration: 40 minutes
dehydration: 22 minutes Table 11 illustrates the production of fines, in weight, and as cumulative percentages at every cycle under Cycle P1 and Cycle P2 reaction conditions.

TABLE 11

Fines accumulation under Cycle P1 and Cycle P2 reaction conditions.

| | Cumulative mass (g) | | Cumulative percentages | |
|---|---|---|---|---|
| Calcination | Cycle P1 | Cycle P2 | Cycle P1 | Cycle P2 |
| 2 | 1.79 | 1.88 | 3.2 | 3.4 |
| 5 | 3.64 | 1.81 | 6.5 | 3.2 |
| 8 | 4.17 | 1.6 | 7.4 | 2.9 |
| 10 | 4.2 | 1.53 | 7.5 | 2.7 |
| 22 | 6.63 | 1.85 | 11.8 | 3.3 |

The data in Table 11 show that the modified dehydration step (Cycle P2) significantly reduced the amount of fines produced during the reaction cycling.

Figure 8:
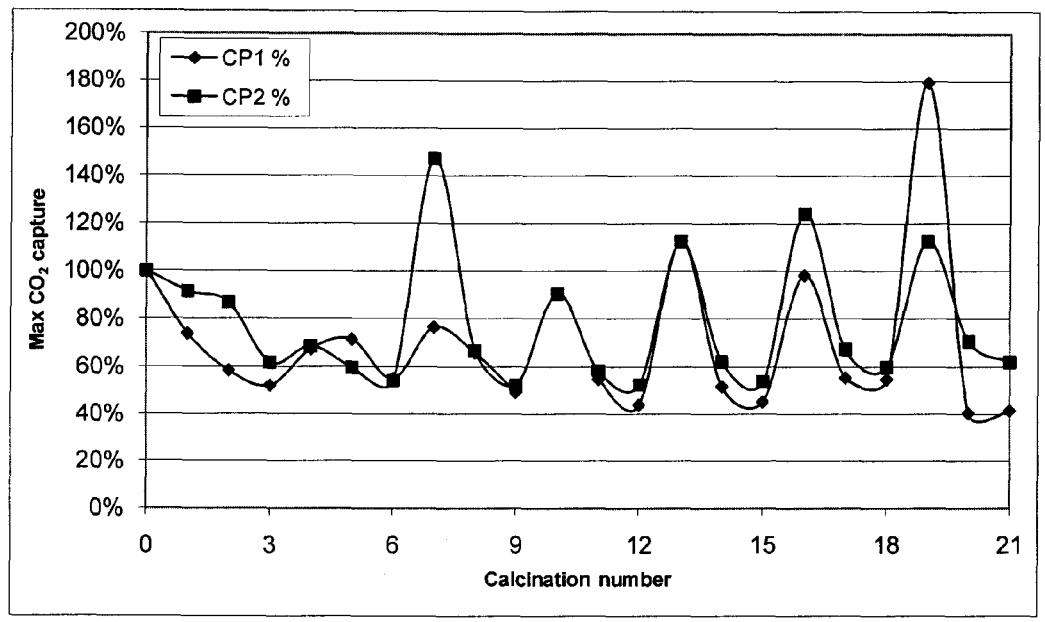
FIG. 8 shows the $CO_2$ capture activity for CaO as a $CO_2$ sorbent over several calcination-carbonation reaction cycles with intermittent hydration and calcination-carbonation reaction cycles with intermittent hydration and dehydration under $CO_2$.

The reaction conversions under Cycle P1 and Cycle P2 reaction conditions are shown in FIG. 8. The measurements over 100% are obviously incorrect and are due to water residues in the system, which increase the mass flow meter measurements.

Both the Cycle P1 and Cycle P2 reaction conditions achieve very similar CO$_2$ capture capacities, which are significantly higher than those for conventional carbonation-calcination cycling.

Four more experiments were conducted in the small fluidized bed reactor with conditions identical to those of the large reactor. These experiments included the use of different sorbent materials and increased the number of reaction cycles beyond the 22 calcinations for Cycles P1 and P2.

The reaction conditions for Cycle P5 were identical to those for Cycle P2 but used sorbent material from a different part of the Taylors Lime quarry in a reaction sequence including intermittent hydration (every three calcinations) but in which the hydration was followed by the modified dehydration step. The reaction conditions for Cycle P3 were identical to those for Cycle P1, but used a different sorbent material in a reaction sequence including intermittent hydration (hydration every three carbonations). The reaction conditions for Cycle P4 were identical to those for Cycle 4 and used the same material in a reaction sequence that used periodic hydration. The reaction conditions for Cycle P9 were identical to those for Cycle P2 but used a different sorbent material in a reaction sequence including intermittent hydration (every three calcinations) but in which the hydration was followed by the modified dehydration step.

The sorbent material for Cycle P3 was Fernbrae dolomitic lime supplied by Golden Bay Cement, Portland, Northland, New Zealand. The sorbent material for Cycle P9 was OmyaCal limestone supplied by Omya. New Zealand Limited, Te Kuiti, Waikato, New Zealand. The sorbent material was sieved, washed and then sieved between 300-600 μm.

Table 12 illustrates the production of fines with a particle size of less than 150 μm as cumulative percentages and the average reaction conversions under Cycle P1, P2, P3, P4, P5 and P9 reaction conditions.

TABLE 12

Fines accumulation and average $CO_2$ capture under Cycle P1, P2, P3, P4, P5 and P9 reaction conditions.

| | | Calcination | | | | | | | | | |
|---|---|---|---|---|---|---|---|---|---|---|---|
| | | 2 | 5 | 8 | 10 | 13 | 22 | 41 | 53 | 64 | 76 |
| Cycle P1 | <150 μm-% | 3.2 | 6.5 | 7.4 | 7.5 | | | | | | |
| | Av. % $CO_2$ Capture | 54 | 57 | 58 | 47 | | | | | | |
| Cycle P2 | <150 μm-% | 3.4 | 3.2 | 2.9 | 2.7 | 3 | | | | | |
| | Av. % $CO_2$ Capture | 72 | 52 | 48 | 45 | 54 | | | | | |
| Cycle P5 | <150 μm-% | | | | | | | 5.5 | 5 | 6.5 | 8 |
| | Av. % $CO_2$ Capture | 58 | | | 46 | | | 57 | 51 | | |
| Cycle P3 | <150 μm-% | | | | | 9.5 | | 10 | | | |
| | Av. % $CO_2$ Capture | 75 | | | | 63 | | 51 | | | |
| Cycle P4 | <150 μm-% | | | | 10.8 | | | | | | |
| | Av. % $CO_2$ Capture | ≈60-80 | | | ≈60-80 | | | | | | |
| Cycle P9 | <150 μm-% | | | | | 2.5 | | | | | |
| | Av. % $CO_2$ Capture | | | | | | | | | | |

Cycles P1, P2 and P4 all utilized the same sorbent material. Comparison of the data for these reaction conditions in Table 12 shows that the Cycle P2 reaction conditions, in which the reaction sequence included intermittent hydration (every three calculations) followed by the modified dehydration step, greatly reduced the sorbent fragmentation while maintaining high $CO_2$ capture capacity.

Although the Cycle P4 reaction conditions, in which the reaction sequence includes periodic hydration, provided improved $CO_2$ capture activity compared to Cycle P5, in which the reaction sequence includes intermittent hydration (every three calcinations) followed by the modified dehydration step, the amount of fines produced after only 8 calcinations under Cycle P4 reaction conditions exceeded the amount produced after 76 calcinations under Cycle P5 reaction conditions.

The average $CO_2$ capture activity of the sorbent under Cycle P1 and Cycle P3 reaction conditions, in which the reaction sequence includes intermittent hydration (hydration every three carbonations), was comparable to that under Cycle P2, Cycle P5 and Cycle P9 reaction conditions, in which the reaction sequence included intermittent hydration (every three calcinations) followed by the modified dehydration step. Although the Observed degree of fragmentation varies with the source of the sorbent material, the fragmentation was reduced under Cycle P2, Cycle P5 and Cycle P9 reaction conditions compared to Cycle P1, Cycle P3 and Cycle P4 reaction conditions.

Most of the fragmentation was observed to appear during the first few reaction cycles under Cycle P2, Cycle P5 and Cycle P9 reaction conditions, in which the reaction sequence included intermittent hydration (every three calcinations) followed by the modified dehydration step and the rate of fragmentation is greatly reduced thereafter, at least until the seventieth reaction cycle.

Further Experiments on the Modified Dehydration Step

The experiments under Cycle 8, Cycle P2, Cycle P5 and Cycle P9 reaction conditions demonstrated that the modified dehydration step significantly reduced the fragmentation rate of the sorbent when compared to the conventional dehydration step.

The modified dehydration step follows the hydration of the CaO to $Ca(OH)_2$. In all of the experiments described above, the modified dehydration step comprised heating the $Ca(OH)_2$ under a flow of $N_2$ and $CO_2$ (20%) to 520° C. and holding at that temperature for 22 minutes. After this step, normal cycling was resumed with a carbonation, in which the temperature was raised to 620° C. under a flow of $N_2$ and $CO_2$ (20%).

The following experiments, performed in the small reactor, further investigated the modified dehydration step.

In the first experiment, a bed of freshly hydrated $Ca(OH)_2$ was heated to 520° C. under a flow of $N_2$ and that temperature was held for 23 minutes. FIG. 9 shows the variation with time of the temperature of the bed and the vapor pressure of water vapor leaving the bed. At time, equal to 35 minutes the vapor pressure was that of the flow of water introduced into the bed to hydrate CaO to $Ca(OH)_2$. The water flow was stopped at time equal to 43 minutes. As the temperature of the bed increased, the vapor pressure of the water vapor leaving the bed showed a sudden increase at 445° C. This increase was attributed to the dehydration of the $Ca(OH)_2$, which took about 6 minutes to complete.

The CaO formed from the dehydration of the $Ca(OH)_2$ was subsequently carbonated in a stream of $N_2$ and $CO_2$ (20%) at 620° C. The resulting material was then calcined and the $CO_2$ capture capacity of the CaO was measured at about 71% of the total capacity.

Figure 10:
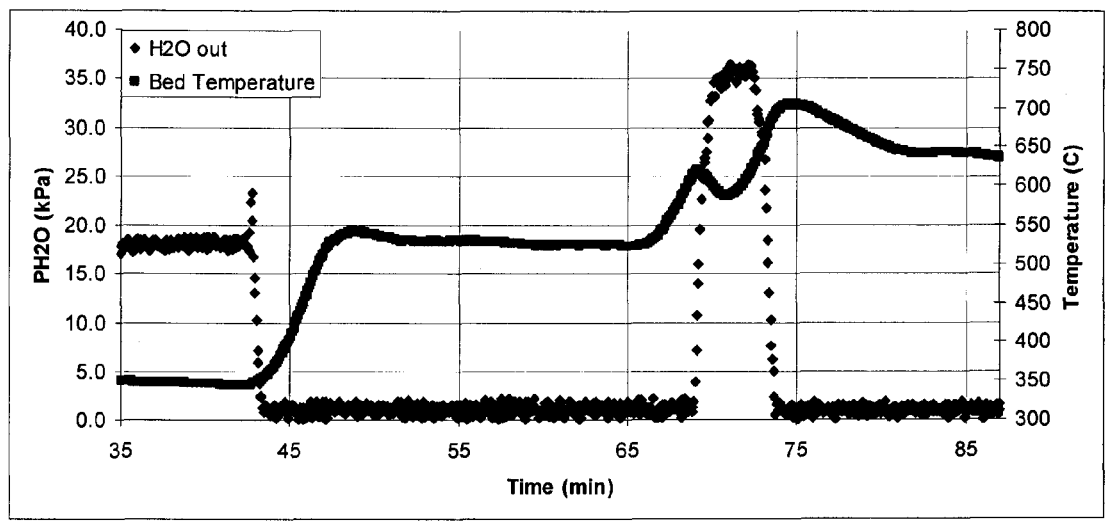
FIG. 10 shows the variation of temperature and the water vapor pressure over a bed of $Ca(OH)_2$ as a function of time during the heating of the bed under $N_2$ and $CO_2$ (20%)

In the second experiment, a bed of freshly hydrated $Ca(OH)_2$ was heated to 620° C. under a flow of $N_2$ and $CO_2$ (20%), the temperature being held at 520° C. for 22 minutes and at 620° C. for 23 minutes. FIG. 10 shows the variation with time of the temperature of the bed and the vapor pressure of water vapor leaving the bed. At time equal to 35 minutes the vapor pressure was that of the flow of water introduced into the bed to hydrate CaO to $Ca(OH)_2$. The water flow was stopped at time equal to 43 minutes. As the temperature of the bed increased, the vapor pressure of the water vapor leaving the bed showed a sudden increase at 618° C. This increase was attributed to the dehydration of the Ca(OH)$_2$, which took about 6 minutes to complete.

Surprisingly, dehydration in the presence of CO$_2$ occurs only when the solid reached 618° C. The thermodynamically predicted vapor pressure of water in equilibrium with CaO at 600° C. is 4 atm. The Ca(OH)$_2$ was expected to have completed dehydration at much lower temperatures, as shown in the first experiment.

The resulting material was calcined and the CO$_2$ capture capacity of the CaO was measured at about 58% of the total capacity.

In the third experiment, a bed of freshly hydrated Ca(OH)$_2$ was heated to 520° C. under a flow of N$_2$ and CO$_2$ (20%) and held at that temperature. The solid was then heated to 620° C. under a flow of N$_2$ and held at that temperature for 22 minutes.

Figure 11:
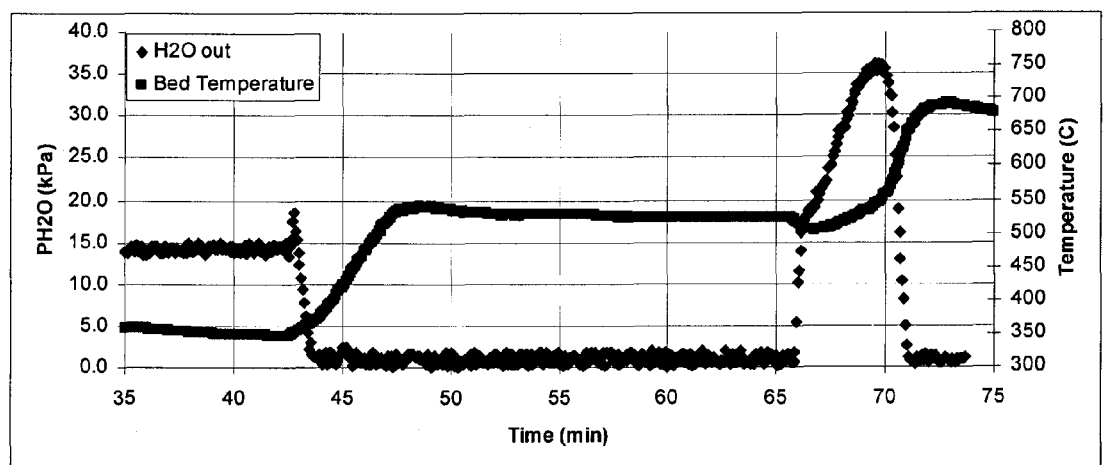
FIG. 11 shows the variation of temperature and the water vapor pressure over a bed of $Ca(OH)_2$ and temperature as a function of time during the heating of the under $N_2$ and $CO_2$ (20%) followed by further heating under $N_2$.

FIG. 11 shows the variation with time of the temperature of the bed and the vapor pressure of water vapor leaving the bed.

The resulting material was then calcined. It was determined, from the amount of CO$_2$ released, that 15% of the material was calcium carbonate. This material must have formed in the presence of CO$_2$ while the material largely comprised Ca(OH)$_2$. This experiment illustrates that Ca(OH)$_2$ does not react with CO$_2$, or only reacts very slowly with CO$_2$.

Discussion

In the experiment depicted in FIG. 11, most of Ca(OH)$_2$ dehydrated when the flow of N$_2$ and CO$_2$ (20%) was replaced with a flow of N$_2$. A comparison of the experiment shown in FIG. 9 and that shown in FIG. 10 shows that the time necessary to dehydrate the Ca(OH)$_2$ was the same, whether or not CO$_2$ was present in the gas flow. It appears that the absorption of CO$_2$ does not cause the displacement of H$_2$O, and that dehydration is the controlling process. Carbonation can only start when the Ca(OH)$_2$ is dehydrated, so that CaO and not Ca(OH)$_2$ is carbonated. It appears that carbonation and dehydration are separate processes and do not occur simultaneously.

It appears that the CO$_2$ in the gas flow inhibits dehydration of the Ca(OH)$_2$ and enables the formation of "superheated" (thermodynamically unstable) Ca(OH)$_2$, which is largely unable to establish thermodynamic equilibrium by losing water.

Ca(OH)$_2$ Decomposition Temperature

To further examine the effect of CO$_2$ concentration on the dehydration temperature of Ca(OH)$_2$, five separate experiments were performed in Which a bed of freshly hydrated Ca(OH)$_2$ was heated to 620° C. under a flow of N$_2$ and CO$_2$ (12.5%, 25%, 37.5%, 70%, and 100%), the temperature being held at 520° C. for 22 minutes and at 620° C. for 23 minutes. As the temperature of the bed increased, the water vapor pressure of the gas leaving the bed showed a sudden increase at:

529° C. for the 12.5% CO$_2$/N$_2$ mixture;
543° C. for the 25% CO$_2$/N$_2$ mixture;
611° C. for the 37.5% CO$_2$/N$_2$ mixture;
619° C. for the 70% CO$_2$/N$_2$ mixture; and
620° C. for 100% CO$_2$ gas.

The observed increase in the water vapor pressure of the gas leaving the bed was attributed to the dehydration of the Ca(OH)$_2$, which took about 6 minutes to complete. FIG. 12 shows that the temperature at which the dehydration of Ca(OH)$_2$ starts increases as the percentage of CO$_2$ in the enveloping gas increases.

Resistance to Attrition and Ca(OH)$_2$ Decomposition Temperature

The material formed from the dehydration of Ca(OH)$_2$ at elevated temperatures under a 37.5% CO$_2$/N$_2$ mixture showed improved resistance to attrition during calcination/carbonation cycling in a fluidized bed.

Three similar attrition experiments were performed in which Ca(OH)$_2$ was decomposed under a flow of: N$_2$ (0% CO$_2$); a 10% CO$_2$/N$_2$ mixture; and CO$_2$. These experiments were performed using the same reaction sequence as Cycle P2, and the attrition rates were measured in the same way—by measuring the proportion of particles with a size <150 μm at the end of the cycling experiment, whether the particles elutriated from the fluidized bed or not. The results of these experiments, and their comparison with the experiment using a 37.5% CO$_2$/N$_2$ mixture, are shown in Table 13.

TABLE 13

Effect of CO$_2$ concentration during Ca(OH)$_2$ dehydration on fragmentation and CO$_2$ capture.

| | | % Fragmentation after | | % CO$_2$ Capture |
|---|---|---|---|---|
| Experiment | % CO$_2$ | 10 Calcinations | 19 Calcinations | Activity |
| P2-25 | 100 | 2.4 | 3.2 | 50% |
| P2-16 | 37.5 | 3 | 3.6 | 37% |
| P2-24 | 10 | 4.2 | 5.4 | 35% |
| P2-6 | 0 | 5 | 6.1 | 38% |

The data in Table 13 show that rate of fragmentation of CaO particles subject to successive calcination/carbonation cycles in a fluidized bed is significantly reduced by the use of the modified dehydration step, in which the Ca(OH)$_2$ is dehydrated in an atmosphere comprising CO$_2$. The data in FIG. 12 and Table 13 together show that the higher the dehydration temperature of Ca(OH)$_2$ the lower the rate of fragmentation of CaO particles in subsequent calcination/carbonation cycles.

The data in Table 14 show the effect of the modified dehydration step on the performance of the CaO sorbent. In Table 14, "None" is a calcination/carbonation cycling process with no hydration or dehydration, "Normal" refers to a calcination/carbonation cycling process which includes intermittent hydration but with no CO$_2$ present during the dehydration step, and "Modified" refers to a calcination/carbonation cycling process which includes intermittent hydration with 100% CO$_2$ present during the dehydration step.

TABLE 14

Effect of reactivation process on fragmentation and CO$_2$ capture.

| | | % Fragmentation after | | % CO$_2$ |
|---|---|---|---|---|
| Experiment | Dehydration type | 10 Calcinations | 19 Calcinations | Capture Activity |
| P2-30 | None | 0.6 | 1.3 | 25% |
| P2-6 | Normal (No CO$_2$) | 5 | 6.1 | 38% |
| P2-25 | Modified (100% CO$_2$) | 2.4 | 3.2 | 50% |

The experiment using a modified dehydration step, with 100% CO$_2$, provided superior CO$_2$ capture activity after 19 calcination/carbonation cycles compared to the other experiments and the rate of attrition was much lower than the experiment using a conventional dehydration step, during which there is no CO$_2$ present.

"Hold Time"

Two experiments were performed using the same reaction sequence as Cycle P2, using the modified dehydration step with a 37.5% $CO_2/N_2$ mixture but with a hold time at 520° C. of zero minutes for one and 40 minutes for the other. The resulting samples where then subjected to multiple carbonation/calcination cycles and analyzed for particle size and $CO_2$ absorption activity as described above. The results are shown in Table 15.

TABLE 15

Effect of "hold time" on fragmentation and $CO_2$ capture.

| Experiment | Hold time (mins) | % Fragmentation after | | % $CO_2$ Capture Activity |
|---|---|---|---|---|
| | | 10 Calcinations | 19 Calcinations | |
| P2-34 | 40 | 2.2 | 2.6 | 42% |
| P2-31 | 23 | 3.4 | 4.1 | 31% |
| P2-32 | 0 | 4.7 | 5.8 | 45% |

The data in Table 15 show that an increase in the time spent by the $Ca(OH)_2$ at 520° C. under a 37.5% $CO_2/N_2$ mixture substantially reduced the attrition rate, while maintaining $CO_2$ absorption activity.

Hydration Conditions

Experiments were conducted using different amounts of water vapor in the gas used to form $Ca(OH)_2$ from freshly prepared CaO. The experiments were performed using the same reaction sequence as Cycle P2, using the modified dehydration step with a 37.5% $CO_2/N_2$ mixture, but the amount of water injected into the reactor was varied. The results are shown in Table 16.

TABLE 16

Effect of absolute humidity levels on fragmentation and $CO_2$ capture.

| Experiment | Absolute Humidity | % Fragmentation after | | % $CO_2$ Capture Activity |
|---|---|---|---|---|
| | | 10 Calcinations | 19 Calcinations | |
| P2-12 | 27% | 3.5 | 5.5 | 48% |
| P2-16 | 34% | 3.0 | 3.6 | 37% |
| P2-40 | 43% | 2.4 | 4.6 | 38% |

The data in Table 16 show that, in the absolute humidity range from 27% to 43%, the fragmentation rate was lower than that for reactions including hydration but with no $CO_2$ present during the dehydration step (see Table 14). In addition, the $CO_2$ absorption activity was higher than that observed when no hydration/dehydration is used. This data shows that the efficacy of the hydration/dehydration process for restoring $CO_2$ absorption activity is not strongly dependent on the absolute humidity level during the formation of $Ca(OH)_2$.

Further experiments were conducted to examine the effect of hydration temperature on the rate of fragmentation and the $CO_2$ absorption activity during calcination/carbonation. The results are shown in Table 17.

TABLE 17

Effect of hydration temperature on fragmentation and $CO_2$ capture.

| Experiment | Hydration Temperature (° C.) | % Fragmentation after | | % $CO_2$ Capture Activity |
|---|---|---|---|---|
| | | 10 Calcinations | 19 Calcination | |
| P2-8 | 361-374 | 3.7 | 4.4 | 44% |
| P2-12 | 312-329 | 3.5 | 5.5 | 48% |
| P2-4 | 340-400 | 4.3 | 4.4 | 38% |

The data in Table 17 show that the rate of fragmentation is unaffected by hydration temperatures in the range of 312° C.-400° C. However, $CO_2$ absorption activity is favored by the lower temperature range for hydration of 312° C.-329° C.

Temperature Profile

A first cycling experiment was performed using the same reaction sequence as Cycle P2 but with a variation of the modified dehydration step. In this experiment, a bed of freshly hydrated $Ca(OH)_2$ was heated at a constant rate of temperature increase of about 13° C./minute up to 620° C. under a flow of $N_2$ and $CO_2$ (37.5%). This modified dehydration step was followed by normal carbonation/calcination cycling as described above and the sorbent analyzed for fragmentation rate and $CO_2$ absorption activity. The data is presented in Table 18 as Experiment P2-41.

In a second cycling experiment, the bed of freshly hydrated $Ca(OH)_2$ was heated to 520° C. under a flow of $N_2$ and $CO_2$ (37.5%) and held for 23 minutes at that temperature. This modified dehydration step was followed by normal carbonation/calcination cycling as described above and the sorbent analyzed for fragmentation rate and $CO_2$ absorption activity. The data is presented in Table 18 as Experiment P2-31.

In Table 18, Experiments P2-41 and P2-31 are compared with the "Normal" cycle, which includes hydration but with no $CO_2$ present during the dehydration. Both Experiments produce a sorbent that has a higher resistance to attrition than the conventional hydration process in which no $CO_2$ is present during the dehydration.

TABLE 18

Effect of temperature profile on fragmentation and $CO_2$ capture.

| Experiment | Variant | % Fragmentation after | | % $CO_2$ Capture Activity |
|---|---|---|---|---|
| | | 10 Calcinations | 19 Calcinations | |
| P2-6 | Normal (No $CO_2$) | 5 | 6.1 | 38% |
| P2-41 | No hold | 2 | 4.7 | 37% |
| P2-31 | Hold at 520° C. | 3.4 | 4.1 | 31% |

Heat Up Rate

An experiment was performed using the conditions described above for Experiment P2-41 but in which the constant rate of temperature increase of the bed of freshly hydrated $Ca(OH)_2$ was about 40° C./minute up to 620° C. The data are included in Table 19, together with those for Experiment P2-41. The data show that the heat up rate affects the rate of fragmentation during subsequent calcination/carbonation cycles only for about 10 calcinations. Also, an increased heat up rate appears to provide higher $CO_2$ absorption activity.

TABLE 19

Effect of heat up rate on fragmentation and $CO_2$ capture.

| Experiment | Heat up rate (° C./min) | % Fragmentation after 10 Calcinations | % Fragmentation after 19 Calcinations | % $CO_2$ Capture Activity |
|---|---|---|---|---|
| P2-32 | 40 | 4.7 | 5.8 | 45% |
| P2-41 | 13 | 2 | 4.7 | 37% |

Stopping $CO_2$ Flow

A first cycling experiment was performed using the same reaction sequence as Cycle P2 but with a variation of the modified dehydration step. In this experiment, a bed of freshly hydrated $Ca(OH)_2$ was heated to 520° C. under a flow of $N_2$ and $CO_2$ (37.5%). The temperature was held at 520° C. for 23 minutes. Instead of continuing with normal carbonation/calcination cycling, the $CO_2$ supply was abruptly terminated and only $N_2$ continued to flow. The solid was held at 520° C. under a flow of $N_2$ for 22 more minutes. Within a minute of the $CO_2$ supply being terminated, the humidity sensor recorded a significant increase in water outflow from the reactor indicating that the $Ca(OH)_2$ had substantially dehydrated. The newly formed CaO was then subjected to normal carbonation/calcination cycling as described above and analyzed for fragmentation rate and $CO_2$ absorption activity. The data are presented in Table 20 as Experiment P2-5.

In a second cycling experiment, the bed of freshly hydrated $Ca(OH)_2$ was heated to 520° C. under a flow of $N_2$ and $CO_2$ (37.5%) and held at that temperature for 23 minutes. Normal carbonation/calcination cycling as described above was then performed and the sorbent analyzed for fragmentation rate and $CO_2$ absorption activity. The data are presented in Table 20 as Experiment P2-16.

TABLE 20

Effect of stopping $CO_2$ flow on fragmentation and $CO_2$ capture.

| Experiment | Variant | % Fragmentation after 10 Calcinations | % Fragmentation after 19 Calcinations | % $CO_2$ Capture Activity |
|---|---|---|---|---|
| P2-5 | Remove $CO_2$ | 4.2 | 4.7 | 36% |
| P2-16 | Maintain $CO_2$ | 3 | 3.6 | 38% |
| P2-6 | Normal (No $CO_2$) | 5 | 6.1 | 38% |

The data show that maintaining the $CO_2$ during the dehydration of $Ca(OH)_2$ produces a lower fragmentation rate during multiple calcination/carbonation cycles in a fluidized bed than does removing the $CO_2$ during dehydration. Both experiments produced a sorbent that has a higher resistance to attrition than the equivalent experiment in which no $CO_2$ was present during the dehydration step.

Discussion

The inhibition of the dehydration of $Ca(OH)_2$, as shown by an increased decomposition temperature, is an increasing function of the concentration of $CO_2$ in the enveloping gas as shown in FIG. 12.

CaO that has been formed by dehydrating $Ca(OH)_2$ has been shown to have restored ability of the resulting CaO to react with $CO_2$ gas throughout several cycles. However, dehydration performed in the absence of $CO_2$ gas, or at minimal $CO_2$ concentration, results in CaO particles that are weakened and suffer increased attrition in a fluidized bed. Dehydration of $Ca(OH)_2$ performed in the presence of $CO_2$, and particularly when the $CO_2$ concentration is above 10% by mass, provides CaO particles that are more resistant to attrition in a fluidized bed.

CONCLUSIONS

Hydrating CaO restores its capacity to capture $CO_2$ after several calcination/carbonation cycles, but also induces substantial fragmentation which limits the practical application of this method. Intermittent hydration reduces sorbent fragmentation compared to periodic hydration, but the fragmentation levels remain significant. Unsurprisingly, the source of the sorbent did not affect the activity levels throughout the reaction cycles. It appears that the process conditions, in particular the frequency of hydration, are the main controlling factor of the $CO_2$ capture activity.

Intermittent hydration using a dehydration step in the presence of $CO_2$ maintains high physical strength of the sorbent while at the same maintaining high $CO_2$ capture capacity. Dehydrating $Ca(OH)_2$ in the presence of $CO_2$ leads to dehydration taking place at a higher temperature than that which is observed for dehydration under $N_2$ only. This enables $CO_2$ capture cycling with a sorbent that retains physical activity (no fragmentation) and chemical activity (high $CO_2$ capture percentage) throughout many cycles.

It is not the intention to limit the scope of the invention to the abovementioned examples only. As would be appreciated by a skilled person in the art, many variations are possible without departing from the scope of the invention as set out in the accompanying claims.

The invention claimed is:

1. A process for restoring the ability of an alkaline earth metal oxide to react with $CO_2$, wherein the alkaline earth metal oxide is used in a cyclic process, wherein the alkaline earth metal oxide is reacted with $CO_2$ to form an alkaline earth metal carbonate and the alkaline earth metal carbonate is calcined to regenerate the alkaline earth metal oxide, the process comprising the steps of:
   (a) contacting the alkaline earth metal oxide with water to form an alkaline earth metal hydroxide;
   (b) heating the alkaline earth metal hydroxide in a first gas stream, wherein the first gas stream comprises $CO_2$, to a temperature higher than the normal decomposition temperature for the alkaline earth metal hydroxide; and
   (c) dehydrating the alkaline earth metal hydroxide to regenerate the alkaline earth metal oxide.

2. A process as claimed in claim 1, wherein, in step (b), the alkaline earth metal hydroxide is heated in the first gas stream comprising $CO_2$ to a temperature and for a time and at a concentration of $CO_2$ effective to suppress the dehydration of the alkaline earth metal hydroxide and reduce the attrition and fragmentation rates, compared to those that would otherwise occur, of the alkaline earth metal oxide formed upon dehydration of the alkaline earth metal hydroxide.

3. A process as claimed in claim 1, wherein the alkaline earth metal oxide is contacted with water vapor to form the alkaline earth metal hydroxide.

4. A process as claimed in claim 3, wherein the alkaline earth metal oxide is contacted with water vapor at an absolute humidity from 5% to 100%.

5. A process as claimed in claim 3, wherein the alkaline earth metal oxide is contacted with water vapor at an absolute humidity from 30% to 43%.

6. A process as claimed in claim 3, wherein the alkaline earth metal oxide is contacted with water vapor at a temperature from 100° C. to 400° C.

7. A process as claimed in claim 1, wherein the first gas stream comprises 20% to 100% $CO_2$.

8. A process as claimed in claim 1, wherein the first gas stream comprises 30% to 100% $CO_2$.

9. A process as claimed in claim 1, wherein the first gas stream comprises 37.5% to 100% $CO_2$.

10. A process as claimed in claim 1, wherein the temperature in step (b) is at least about 50° C. higher than the normal decomposition temperature for the alkaline earth metal hydroxide.

11. A process as claimed in claim 1, wherein the temperature in step (b) is from 500° C. to 600° C.

12. A process as claimed in claim 1, wherein the temperature in step (b) is maintained constant for a period of time.

13. A process as claimed in claim 1, wherein the total time spent by the alkaline earth metal hydroxide at a temperature that is higher than the normal decomposition temperature for the alkaline earth metal hydroxide is at least about 10 minutes.

14. A process as in claim 1, wherein the alkaline earth metal hydroxide is heated to a temperature from 500° C. to 800° C. to dehydrate the alkaline earth metal hydroxide and regenerate the alkaline earth metal oxide.

15. A process as claimed in claim 1, wherein the alkaline earth metal hydroxide is dehydrated in a second gas stream to regenerate the alkaline earth metal oxide.

16. A process as claimed in claim 1, wherein at least one step of the process is performed in one or more fluidized or moving bed.

17. A process as claimed in claim 1, wherein the alkaline earth metal oxide is selected from: CaO; MgO; and mixtures thereof.

18. A process as claimed in claim 17, wherein the alkaline earth metal oxide is CaO.

19. A process as claimed in claim 1, wherein the alkaline earth metal oxide retains an average $CO_2$ absorption capacity of at least about 40%, measured with respect to the initial capacity, after 75 calcinations.

* * * * *